United States Patent [19]

Nishimura

[11] Patent Number: 4,933,088

[45] Date of Patent: Jun. 12, 1990

[54] METHOD OF AND APPARATUS FOR TREATING WATER UTILIZING PROTON-RELEASING SUBSTANCE AND/OR MAGNETIC FIELD

[75] Inventor: Tsutomu Nishimura, Hyogo, Japan

[73] Assignee: Kabushiki Kaisha Astec, Hyogo, Japan

[21] Appl. No.: 168,121

[22] PCT Filed: Jul. 8, 1987

[86] PCT No.: PCT/JP87/00484

§ 371 Date: Feb. 23, 1988

§ 102(e) Date: Feb. 23, 1988

[87] PCT Pub. No.: WO88/00574

PCT Pub. Date: Jan. 28, 1988

[30] Foreign Application Priority Data

Jul. 11, 1986 [JP] Japan ............................... 61-164352
Dec. 10, 1986 [JP] Japan ............................... 61-294538

[51] Int. Cl.$^5$ ............................... C02F 1/48; C02F 1/52
[52] U.S. Cl. ............................... 210/695; 210/702; 210/714; 210/724; 210/743; 210/764; 210/800
[58] Field of Search ............... 210/695, 764, 702, 730, 210/723, 800, 716, 709, 712, 714, 724, 743; 209/3, 5, 8, 214, 232; 422/1, 28

[56] References Cited

U.S. PATENT DOCUMENTS

| | | | |
|---|---|---|---|
| 589,460 | 9/1897 | Adeney et al. | 210/716 |
| 2,125,846 | 8/1938 | Laughlin | 210/695 |
| 2,232,296 | 2/1941 | Urbain et al. | 210/695 |
| 3,142,638 | 7/1964 | Blaisdell et al. | 210/695 |
| 3,544,476 | 12/1970 | Aiba et al. | 210/702 |
| 3,549,527 | 12/1970 | Peck et al. | 210/695 |
| 3,650,698 | 3/1972 | Adler | 210/695 |
| 3,697,420 | 10/1972 | Blaisdell et al. | 210/695 |
| 4,065,386 | 12/1977 | Rigby | 210/695 |
| 4,113,466 | 9/1978 | Weston | 209/3 |
| 4,193,791 | 3/1980 | Weston | 209/5 |

FOREIGN PATENT DOCUMENTS

| | | | |
|---|---|---|---|
| 2472951 | 7/1981 | France | 210/702 |
| 36-17244 | 4/1957 | Japan . | |
| 51-76843 | 7/1976 | Japan . | |
| 52-71854 | 6/1977 | Japan . | |
| 59-87091 | 5/1984 | Japan . | |

OTHER PUBLICATIONS

Conley, W. R., Handord Atomic-Energy Plant, Journal AWWA, Jul. 1954, pp. 629–633.

Primary Examiner—W. Gary Jones
Attorney, Agent, or Firm—Wenderoth, Lind & Ponack

[57] ABSTRACT

A method of and an apparatus for treating water by providing a water being treated with a crystal water-containing proton-releasing crystalline mineral and/or a magnetic field, while controlling the amount of proton released and the strength of said magnetic field as control indicators so as to remove, reduce, vanish or deproliferate the cations, a part of the anions, eutrophicated substances, chlorophyll, algae, bacteria and the like which are contained in the water by flocculating them, making them adsorbed to flocs or making them colloidal.

11 Claims, 34 Drawing Sheets

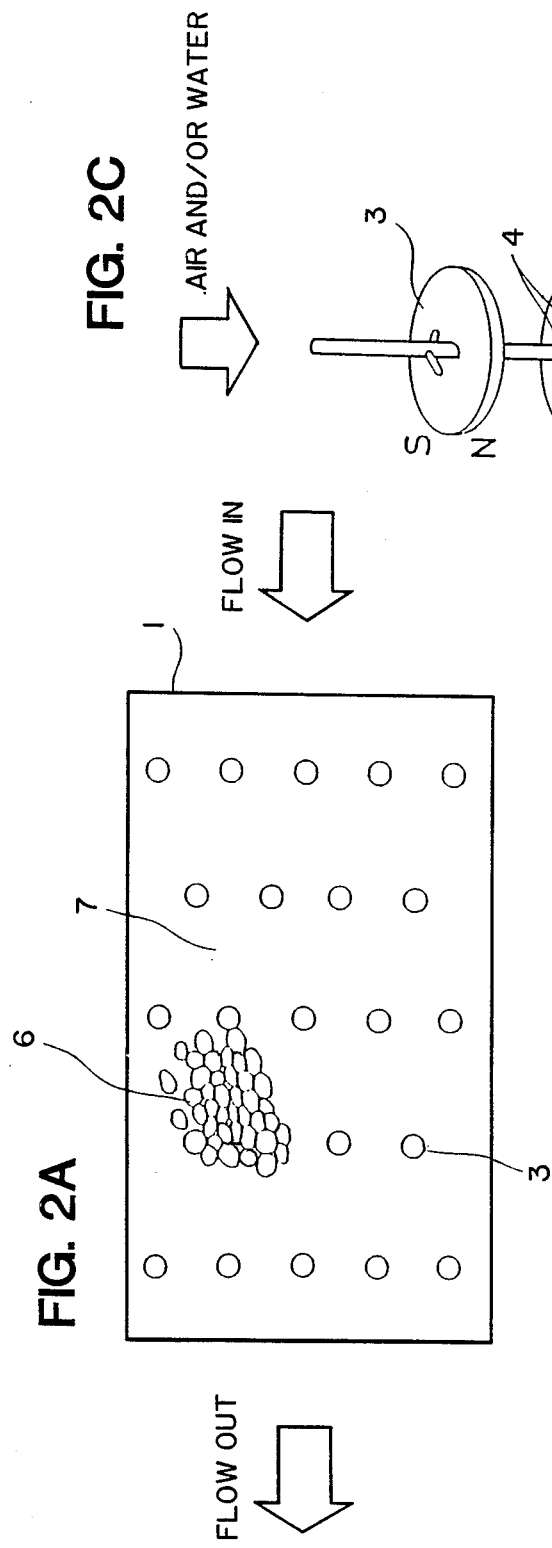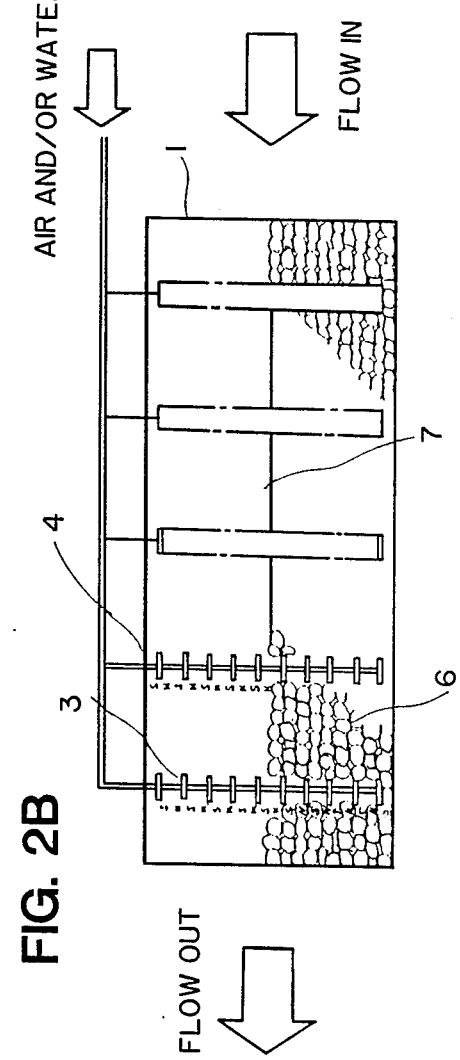

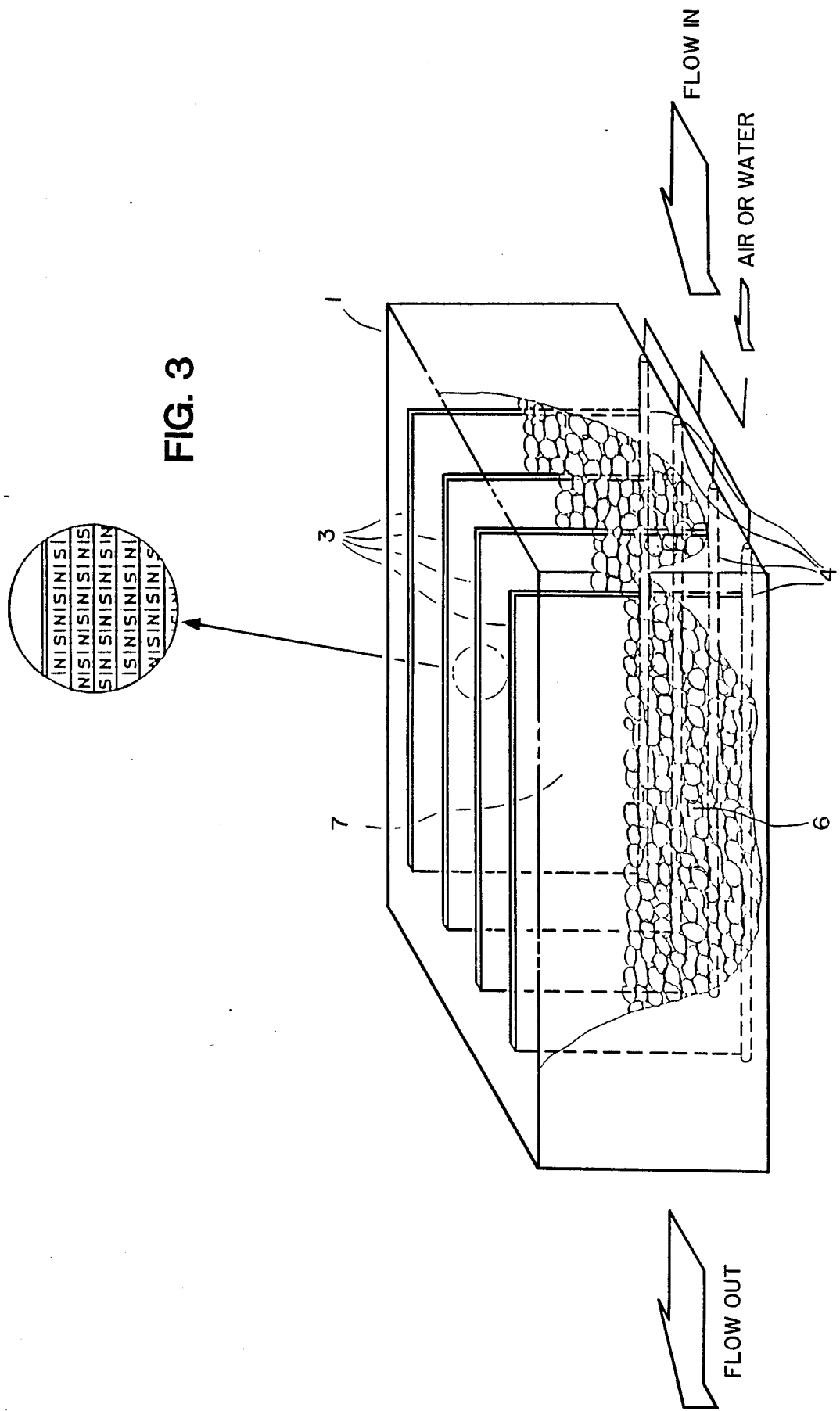

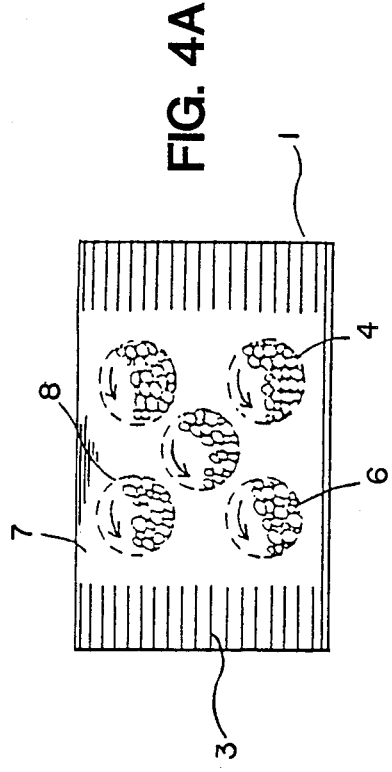
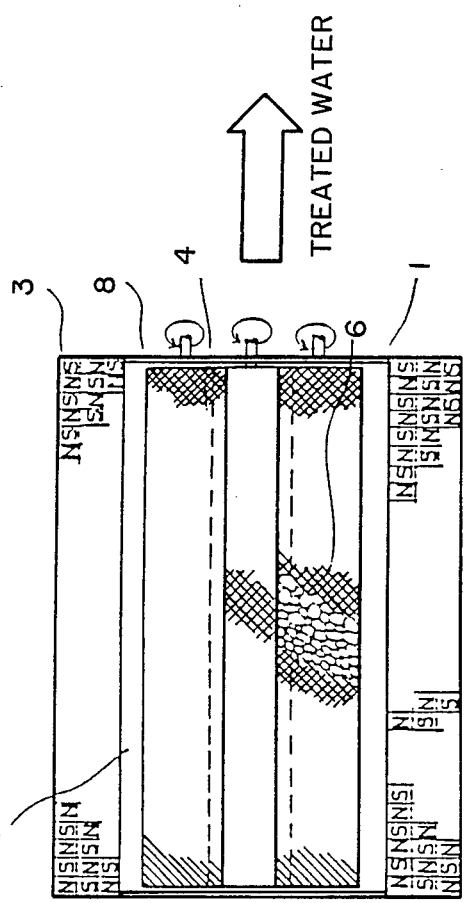

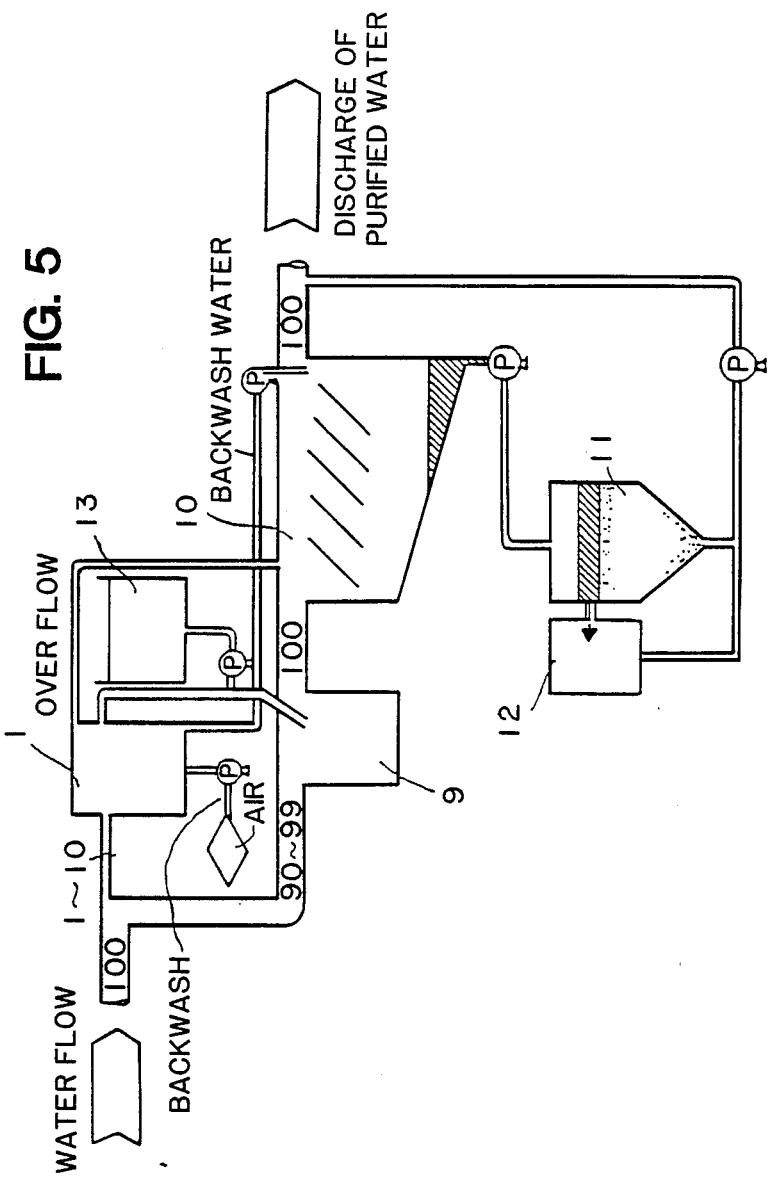

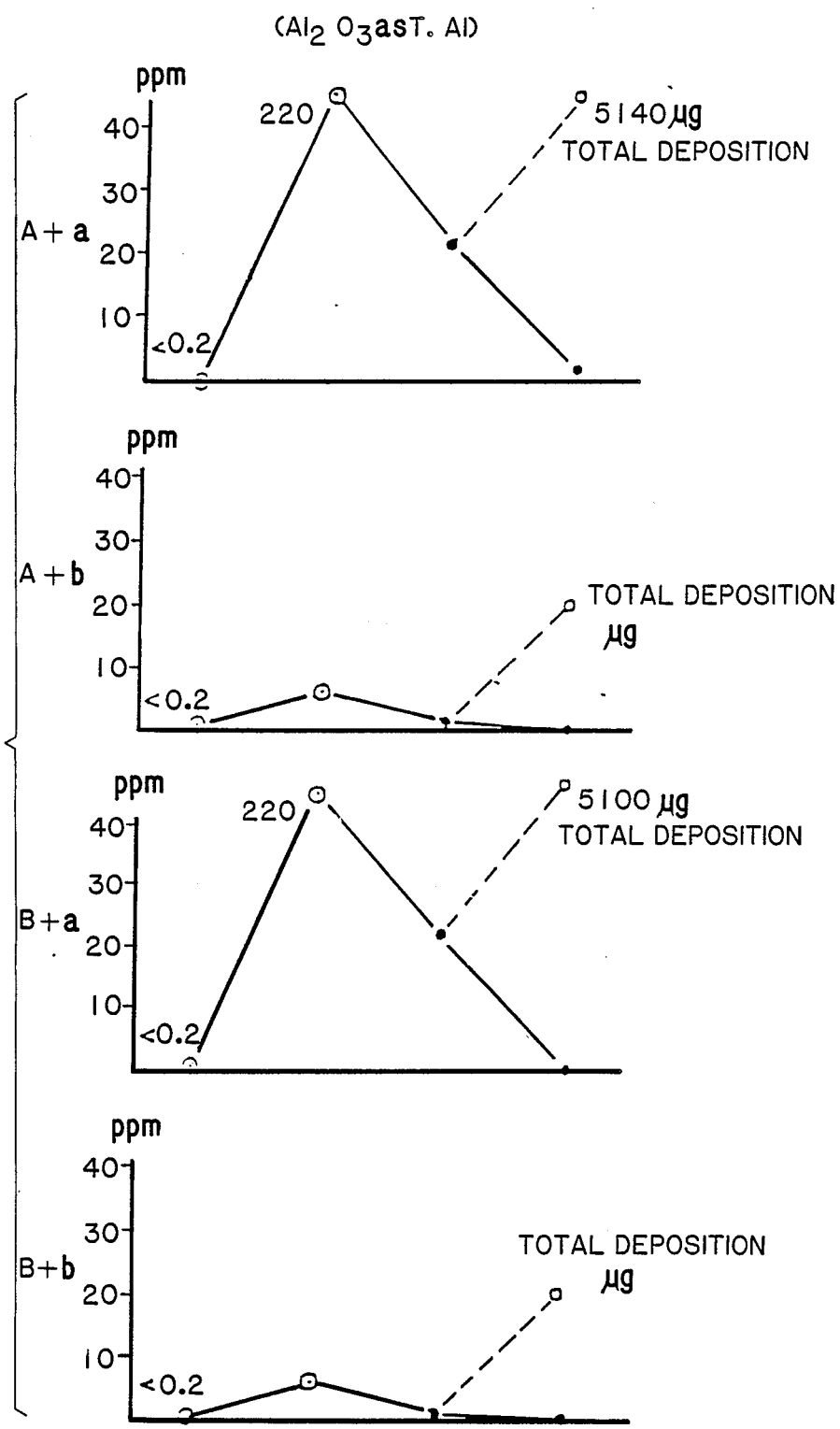

METHOD OF AND APPARATUS FOR TREATING WATER UTILIZING PROTON-RELEASING SUBSTANCE AND/OR MAGNETIC FIELD

TECHNICAL FIELD

The present invention relates to a method of an apparatus for treating water adopted for, for example, purification of various waters including agricultural effluent, domestic waste water, the water of a closed water area, the water of a fish pond (algae-containing water), mixed water of domestic waste water and sea water, sea water and underground water, and softening of hard water. More particularly, the present invention relates to a method of and an apparatus for treating water characterized in that a proton releasing substance and/or a magnetic field are provided for a water being treated, while controlling the amount of proton released and/or the strength of the magnetic field as control indicators so as to remove, reduce, vanish or deproliferate the cations, a part of the anions, eutrophicated substances, chlorophyll, algae, bacteria and the like which are contained in the water, or to remove alkali earth metal ions chiefly consisting of calcium ions and magnesium ions from the water to soften hard water.

BACKGROUND ART

Contamination of closed water areas including lakes and marshes and inland seas by phosphorus and eutrophicated substances has now become a big problem not only in Japan but also all over the world. It is well known that the progress of such contamination is derived from the eutrophicated substances contained in the agricultural effluent, domestic waste water, etc., which flow into the lakes and marshes and inland seas and the lowering of the water level of the water area due to the development of coasts.

Accordingly, techniques for restraining eutrophicated substances from flowing into closed water areas, for example, concentrated treatment of city life type domestic waste water, agricultural community waste water and top soil eluting substances produced by agricultural effluent and rain water, and various techniques for maintaining and enhancing the self purification capacity, for example, techniques of removing deposited sludges and algae, charging chemical substances such as lime and blowing oxygen or air into the water have been carried out.

As a method of softening hard water, a method of depositing alkali earth metals (e.g., CaO) by storing the hard water for a certain period, removing the alkali earth metals by distillation or with an ion exchange resin, and a method of depositing these metals by boiling and using the supernatant liquid are known.

These prior arts, however, involve the following problems: in the case of using an absorbent, flocculating agent, neutralizing agent, oxidizing agent, reducing agent, etc., since secondary contaminating substances are mixed into the treatment water and a large amount of sludge is generated, it is necessary to remove them; and in the case of carrying out other techniques, even if a large sum of equipment cost and running cost is invested, satisfactory effects have not yet been produced.

In a method of storing hard water for a certain period for softeining it in the prior art, if the concentration of the alkali earth metals dissolved in the water is high, the pH of the water becomes weakly alkaline in most cases. Therefore, the water is allowed to stand for a long time to generate and deposit calcium hydroxide or the like, but the behaviour is unstable and, further, with the reduction in the concentration, the amount of deposit produced becomes smaller. On the other hand, in the case of softening water by distillation, with an ion exchange resin, or by boiling, the cost is raised, so that the treatment of a large amount of water is difficult.

DISCLOSURE OF INVENTION

Accordingly, it is a primary object of the present invention to provide a method of and an apparatus for treating water which are capable of removing, reducing, vanishing or deproliferating the cations, a part of the anions, eutrophicated substances, chlorophyll, algae, bacteria and the like which are contained in a water being treated by flocculating them, making them absorbed to flocs or making them colloidal.

It is another object of the present invention to provide a method for treating water which prevents secondary contaminating substances from mixing into the water, this phenomenon being inevitable in the prior art, and which produces only a very small amount of sludge.

To achieve this aim, in one aspect of the present invention there is provided a method of treating water which is capable of removing, reducing, vanishing or deproliferating the cations, a part of the anions, eutrophicated substances, chlorophyll, algae, bacteria and the like which are contained in the water, by flocculating them, making them absorbed to flocs or making them colloidal by providing the water being treated with a crystal water-containing proton-releasing crystalline mineral and/or a magnetic field while controlling the amount of proton released and/or the strength of the magnetic field.

In the present invention, under a medium or low proton condition in which a medium or small amount of proton releasing substance is provided for a water system to such an extent that makes the pH of the water after being left to stand for 24 hours not less than 5.6 and under a medium or low magnetic field condition in which the strength of the magnetic field is about 100 to 600 gausses, the cations in the water are readily flocculated and, hence, removed from the water, and further the phosphate ions are absorbed by the flocs and deposited, thereby being eliminated from the water system. Under a high proton condition in which a large amount of proton releasing substance is provided for the water system to such an extent that makes the pH of the water after being left to stand for 24 hours not more than 5.5 and under a high magnetic field condition in which the strength of the magnetic field is, for example, 1,000 to 2,000 gausses, the above-described impurities are apt to be made colloidal, whereby it is possible to obstruct the impurities from becoming a nutrient source for bacteria and prevent the generation of organic deposits or reduce the amount of organic deposit. When the cations contained in the water are mainly alkali earth metal ions such as calcium ions and magnesium ions, if the amount of proton released is made small or medium and the magnetic field is made a medium or low magnetic field having a strength of about 100 to 600 gausses, it is possible to remove the alkali earth metal ions in the form of flocs, thereby softening the hard water.

In another aspect of the present invention, there is provided a method of treating water which is capable of removing, reducing, vanishing or deproliferating the above-described impurities by diluting the treated water obtained by the above-described water treating method (i.e. treating water) with a water being treated and diffusing the former into the latter.

In still another aspect of the present invention, there is provided a method of treating water by adding cations if the cations for generating the flocs for absorption and deposition are insufficient in the treating water and/or the water being treated in the above-described water treating method.

In a further aspect of the present invention, there is provided an apparatus for treating water comprising a water flowing tank or a water pipe which contains a crystal water-containing proton-releasing crystalline mineral; an energized coil provided on the outer periphery of the water flowing tank or the water pipe, or a magnetic material or a magnetism memory provided in the water flowing tank or the water pipe; and a cleaning nozzle which is provided in the water flowing tank or the water pipe for washing the proton-releasing substance and the flocs adhered to the surface of the magnetic material or the magnetism memory with air and/or water therethrough.

BRIEF DESCRIPTION OF DRAWINGS

FIGS. 1 to 4 shows embodiments of an apparatus according to the present invention, wherein

FIG. 2A is a plan view of the structure of a water flowing tank using discal magnets;

FIG. 2B is a vertical sectional view of the structure shown in FIG. 2A;

FIG. 2C is a perspective view of the discal magnets shown in FIG. 2A;

FIG. 3 is a perspective view of a water flowing tank using magnet sheets;

FIG. 4A is a laterally vertical sectional view of a water flowing tank accommodating cristobalite retaining cylinders 8; and FIG. 4B is a longitudinally vertical sectional view of the water flowing tank shown in FIG. 4A;

FIG. 5 schematically shows the method of treating water adopting a diluting method;

FIGS. 7 to 14 are graphs showing the behaviour of ions in various kinds of treating waters which are diluted with various kinds of waters being treated in Example 4;

FIGS. 16 and 17 are graphs showing the behaviour of P and N and the light transmittances of the water of the fish pond subjected to the batch dilution treatment in Example 6;

FIG. 18 is graphs showing the behaviour of P and N and the light transmittances of the water subjected to continuous flowing dilution treatment in Example 7;

FIG. 19 is graphs showing the changes with time in the amounts of total N due to treatment (the upper graph) and changes with time in the amounts of $NH_4$ due to treatment (the lower graph);

FIG. 20 is a graph showing changes with time in the amounts of total P due to treatment;

FIG. 21 is a graph showing changes with time in the amounts of total Fe due to treatment;

FIG. 22 is a graph showing changes with time in the amounts of Ca due to treatment;

FIG. 23 is a graph showing changes with time in COD due to treatment;

FIG. 24 is a graph showing changes with time in the pH value due to treatment;

FIG. 25 is a graph showing magnetic flux density and remaining P;

FIG. 26 is a graph showing magnetic flux density and remaining $NH_4$;

FIG. 27 is a graph showing magnetic flux density and remaining COD; and

FIG. 28 is a graph showing changes in concentration of dissolved Ca.

BEST MODE FOR CARRYING OUT THE INVENTION

Figure 1A:
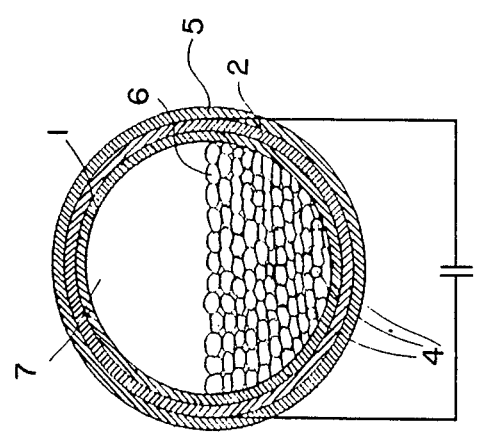
FIG. 1A is a vertical sectional view of a treating tank, taken in parallel to the plane including the diameter of a water pipe.
Figure 1B:
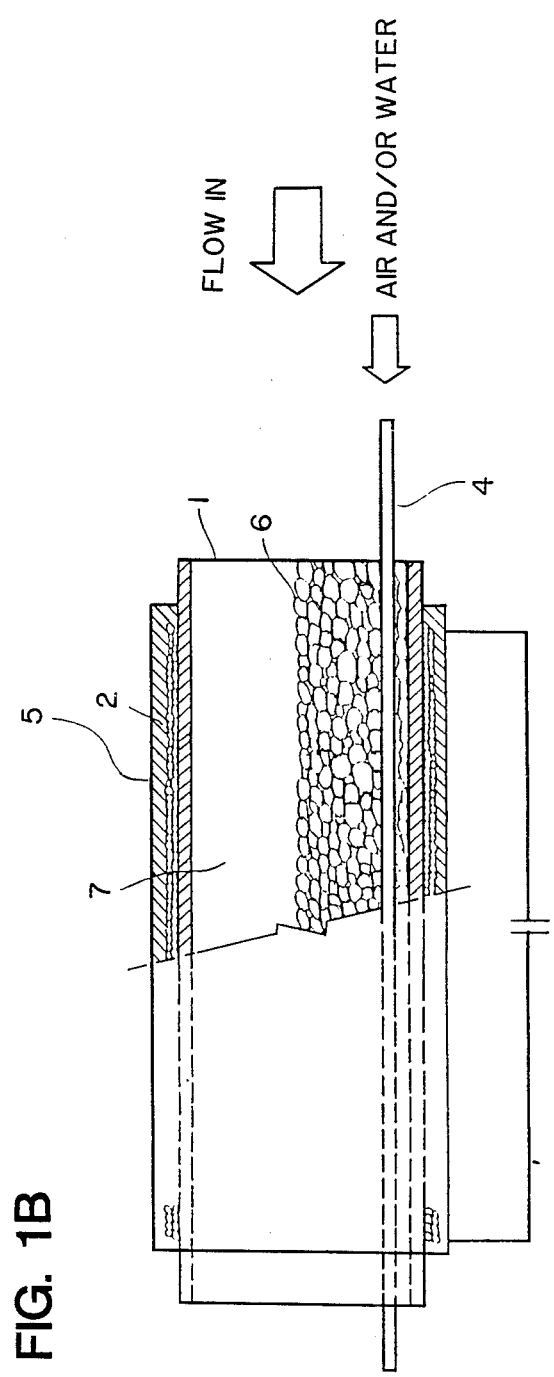
FIG. 1B is a longitudinally vertical sectional view of the water pipe shown in FIG. 1A.

The present invention will be explained with reference to the following examples, but it is to be understood that the present invention is not limited thereto.

The crystal water-containing proton-releasing crystalline mineral used in the following examples is natural cristobalite, but any other mineral that easily releases protons, for example, synthetic cristobalite and zeolite is usable.

The amount of proton released is freely adjustable in accordance with the kind of the crystal water-containing proton-releasing crystalline mineral, the amount of water being treated, the time for treating, etc., and the amount of proton released, namely, whether it is a highly or middle/low proton state is determined by measuring the pH value of the water system which has been provided with a proton-releasing substance such as cristobalite and has been allowed to stand for 24 hours. In other words, the amount of proton released is so controlled as to assume a high proton state having a pH value of not more than 5.5 or a middle or low state having a pH value of not less than 5.6 in accordance with the purpose of treating the water.

As the material for supplying a magnetic field, ferrite magnets or magnet sheets (ferrite pressed sheets with N and S poles disposed in a reticulate state) were used. Magnetic field was supplied by a method of placing a water passage itself in a coil and energizing the coil (the magnetic density can be freely set by varying the number of turns), or a method of disposing a magnetic material or a magnetism memory in the water passage in such a manner that the distribution of magnetic flux is averaged so as to minimize the resistance to the running water (see FIGS. 1, 2, 3 and 4). As the material of the magnetic material or the magnetism memory, general magnetic material or ferrite, barium ferrite, etc. using a plastic material as a binder are used. The latter is preferred.

As for the generation of a deposit by supplying a magnetic field, when a low magnetic field is applied together with the release of protons, the flocculation of the cations greatly progresses and, further, a part of the anions (phosphate ions) are absorbed by the flocs and deposit. A magnetic flux density of about 100 to 600 gausses is preferably for the above-described reaction.

When a high magnetic field is applied together with the release of protons, the cations phosphate ions, grease, protein, etc. are made colloidal so as to be inhibited from becoming a nutrient source for bacteria and to prevent the deposition of organic substances to the bottom of a closed water area, or reduce the amount of deposit.

A magnetic flux density of about 1,000 to 2,000 gausses is preferable for the above-described reaction.

The use of a synthetic zeolite which releases excessive protons also accelerates the colloidal dispersion like the application of magnetic field of a high magnetic density.

In short, the amount of proton released and the strength of a magnetic field are to be selected in accordance with the purpose of treating water.

The analytical method of each element was based on Notification No. 13 of the Environment Agency or the JIS analytical method.

More specifically, each element was analyzed in the following way.

1. Phosphorus

Iron standard liquid was added to a sample being analyzed and further nitric acid and perchloric acid were added thereto. The mixture was heated, concentrated and completely ozidized and the organic substances were decomposed. The phosphorus was quantitatively analyzed by the molybdenum blue method.

2. Nitrogen

A sample being analyzed was subjected to colorimetry by the Kjeldahl-Nessler method, or the Devarda reduction Kjeldahl-Nessler method.

3. Calcium

Hydrochloric acid was added to a sample being analyzed to dissolve the flocs and quantitatively analyzed by the atomic-absorption spectroscopy.

4. Sodium and potassium

Hydrochloric acid and water were added to a sample being analyzed and quantitatively analyzed by the atomic-absorption spectroscopy.

EXAMPLE 1

Investigation on Changes with Time in the Amounts of Phosphorus, Nitrogen Chemical Oxygen Demand (COD), etc, due to the Treatment according to the Present Invention In the experiments in Example 1, the domestic waste water (untreated water, primary treated water and secondary treated water of Omi-hachiman City Housing Development waste-water treating plant) having the composition and the chemical values shown in the above-described table was examined.

100 g of cristobalite and magnet sheets having a strength of 340 Gauss were collectively charged into a 500-ml beaker such that they came into close contact with the inner walls of the beaker, 400 ml of the untreated water, primary treater water secondary treated water was put into the respective beakers. The treating time was set sequentially between 30 minutes and 300 minutes, and the lot which had reached the preset time was immediately filtered through GF/F glass filter paper, and the filtrate from which the flocs were separated was measured to examine the changes with time in the amounts of phosphorus, nitrogen, the chemical oxygen demand (COD), etc. due to the treatment. The results are shown in the following table and FIGS. 19-24.

| Time (min.) | Untreated water | | | | | Primary treated water | | | | | Secondary treated water | | | | |
|---|---|---|---|---|---|---|---|---|---|---|---|---|---|---|---|
| | RF | 30 | 60 | 120 | 300 | RF | 30 | 60 | 120 | 300 | RF | 30 | 60 | 120 | 300 |
| T.N | 22.4 | 17.4 | 14.8 | 12.2 | 10.4 | 18.4 | 16.0 | 16.8 | 16.0 | 15.4 | 21.2 | 18.2 | 17.4 | 17.2 | 16.8 |
| NH4 | 24.6 | 16.8 | 14.0 | 12.4 | 9.6 | 2.0 | tr | tr | tr | tr | 2.4 | tr | tr | tr | tr |
| T.P | 3.20 | 1.32 | 1.16 | 0.90 | 0.70 | 1.32 | 0.44 | 0.40 | 0.34 | 0.26 | 1.52 | 0.46 | 0.34 | 0.29 | 0.20 |
| T.Fe | 6.00 | 5.32 | 4.80 | 4.00 | 3.40 | 0.87 | 0.77 | 0.60 | 0.32 | 0.32 | 1.17 | 0.92 | 0.80 | 0.40 | 0.40 |
| Ca | 18.0 | 13.3 | 11.3 | 9.6 | 8.0 | 17.2 | 15.2 | 14.6 | 15.2 | 14.0 | 17.6 | 15.1 | 14.7 | 14.1 | 14.1 |
| COD | 64.3 | 28.1 | 31.7 | 32.5 | 33.7 | 16.7 | 16.5 | 16.1 | 18.2 | 16.5 | 17.7 | 12.8 | 9.6 | 11.2 | 13.2 |
| pH | 7.18 | 7.01 | 6.86 | 6.81 | 6.38 | 6.10 | 5.83 | 5.42 | 5.44 | 5.01 | 6.29 | 5.80 | 5.67 | 5.14 | 4.87 |

From the above-described results, it is clear that P, $NH_4$, Fe and Ca in the untreated water exhibit the tendency to reduce favorably with the elapse of time. However, in the coexistence of $NO_3$ (in the case of the primary treated water and the secondary treated water), a prominent treating effect is not observed except for P. The untreated water contains a large amount of organic suspended substances, which assume a colloidal state with the elapse of time, and they are considered to be a cause for increasing the COD value.

EXAMPLE 2

Behavior of Ion with Changes in the Maximum Magnetic Flux-Density

In the experiments in Example 2, the waters of irrigation ponds in the vicinity of Kakogawa City which had green algae generated were examined. 800 ml of the water being examined was put into a 1-l beaker and 200 g of natural cristobalite was added thereto. Magnetic fields of 180, 600 and 1,000 Gauss Max were respectively applied to the waters of the beakers, which were

| (Analysis of the Water Examined) | | | | | | | | | | | (ppm) |
|---|---|---|---|---|---|---|---|---|---|---|---|
| | COD | T.N | NH4 | T.P | SO4 | T.Fe | Ca | pH | Mg | suspended substances | Transmittance (%) |
| Untreated water | 64.3 | 22.4 | 24.6 | 3.20 | 31.7 | 6.00 | 18.0 | 7.18 | 5.6 | 340 | 96 |
| Primary treated water | 16.7 | 18.4 | 2.0 | 1.32 | 32.2 | 0.87 | 17.2 | 6.16 | 4.1 | | 98 |
| Secondary treated water | 17.7 | 21.2 | 2.4 | 1.52 | 32.1 | 1.17 | 17.6 | 6.29 | 4.1 | 14.6 | 98 |

Light transmittance was measured on the assumption that the pure water was 100%.

filtered 120 minutes thereafter. The amounts of total P and NH$_4$, the COD value and the light transmittance of each filtrate were measured. The results are shown in the following table and FIGS. 25–27.

|  | Maximum magnetic flux density (GAS) | Trans- mittance (%) | Total P | | NH$_4$ | | COD | |
|---|---|---|---|---|---|---|---|---|
|  |  |  | 1 | 2 | 1 | 2 | 1 | 2 |
| Untreated water | — | 77 | 1.32 | 1.32 | 6.08 | 6.22 | 91.6 | 96.3 |
| Filtered untreated water | — | 97 | 1.22 | 1.25 | 1.46 | 1.46 | 33.5 | 35.5 |
| Treatment No. 1 | 180 | 99 | 0.26 | 0.24 | 0.28 | 0.28 | 31.2 | 30.5 |
| Treatment No. 2 | 600 | 99 | <0.1 | <0.1 | 1.12 | 1.12 | 22.3 | 23.6 |
| Treatment No. 3 | 900 | 99 | <0.1 | <0.1 | 1.33 | 1.20 | 31.1 | 30.3 |

In the results of the experiments, favorable tendency to reduction in the amount of P was observed in a broad range of the magnetic flux density. On the other hand, as to NH$_4$, NH$_4$ was reduced in a range of a low magnetic flux density, like the dephosphorizing reaction, while in a range of a high magnetic flux density, it is considered that the NH$_4$ which had once been separated out as flocs assumes again a colloidal state with the elapse of time and remained.

EXAMPLE 3

Example of Softening Hard Water

Experiments of removing calcium ions from the following samples which suffered from the deleterious effects of hard water were carried out. A trace amount of magnesium ion, etc. was also removed in the form of flocs in the same way as in the case of calcium ions.

Samples (a) The water of the pond in Koyama Garden (underground water)
(b) Higashi-kakogawa; the water of an agricultural irrigation pond (containing domestic waste water and agricultural effluent)
(c) Sweden; the water of Bosta-Trask (lake water)
(d) Sweden; the water of Bruns-Viken (underground water for domestic use)

100 g of cristobalite (Akita) and a magnetic sheet having a strength of 240 gausses were put into a 300-ml beaker, and 250 ml of each sample water was added. Each beaker was covered with a watch glass and after it was allowed to stand for 24 hours the water was filtered through GF/F filter paper. 50 ml of the filtrate was collected and 10 ml of hydrochloric acid was added thereto and subjected to atomic-absorption spectroscopy in a constant volume of 100 ml.

An appropriate amount of untreated water was collected and measured by the atomic-absorption spectroscopy in the same way. The Ca ion concentrations of the untreated waters and the treated waters are shown in the following table and FIG. 28.

| Sample | | Ca ion concentration (ppm) | |
|---|---|---|---|
|  |  | Untreated water | Treated water |
| Bosta-Trask | c | 48 | 2.4 |
| Koyama Garden | a | 28 | 2.0 |
| Bruns-Viken | d | 19.5 | 1.5 |
| Higashi-kakogawa | b | 17.5 | 1.0 |

In the experiments, any drinking water exhibited a favorable tendency to removal of calcium, and it has been made clear that the technique of the present invention is applicable to the softening of hard water and prevention of the deposition off calcium onto the pipes or the like.

FIG. 5 schematically shows a method treating water adopting a diluting method. In FIG. 5, the reference numeral (1) denotes a treating tank using cristobalite and a magnetic field. In the treating tank (1), protons are released and a magnetic field is memorized, whereby treated water, i.e. treating water, is obtained. The reference numeral (9) represents a mixing tank, in which protons and the distribution of a magnetic flux are averaged, the flocculation of cations is progressed, phosphate ions are deposited, nitrogen in an organic state is adsorbed and deposited, and algae are adsorbed and deposited. The reference numeral (10) denotes a deposition tank for carrying out deposition, aging and separation. The reference numeral (11) denotes a filtering tank, in which deposits such as aluminum phosphate, magnesium phosphate, calcium phosphate, nitrogen phosphate, iron phosphate, nitrogen in an organic state, ammonium salts and algae are separated. These separated substances are dehydrated in a deposit dehydrating tank (12) and used as agricultural fertilizers. The reference numeral (13) represents a cation adding tank for adding cations to the treating tank (1) or the mixing tank (9), as occasion demands.

EXAMPLE 4

Ion Behavior in the Various Treating Waters Diluted by Various Untreated Waters 1. Preparation of Treating Water
(a) Treating mixed water consisting of effluent water and sea water It can be said that eutrophicated substances flowing into inland seas, bays, bonds, lakes and marshes are caused from general domestic waste water.

In the experiments, on the assumption that domestic waste water flows into sea water, treating water was prepared by pouring mixed sea water (domestic waste water and seat water which were mixed in a ratio of 1:1) into a treating tank using cristobalite and a magnetic field (220 G), and allowing the sea water to stand for 24 hours. The pH of the thus-obtained treating water used for diluting treatment was intended to be about 5.0 to 3.0.

(b) Treating effluent water

The effluent water of the domestic waste water treating plant (Himeji City, Ebuna Housing Development water treating plant, amount of effluent water: 600 t/day) was treated in the same way as in the case of (a).

2. Investigation on Ion Behaviour in Diluted Water

In order to investigate ion behavior in diluted water, flocs were formed by combining the following untreated waters and treating waters, and the tendency of removal of P and N and the movement of other cations were examined.

Combination 450 ml of effluent water+50 ml of treating water (a)
450 ml of effluent water+50 ml of treating water (b)
45 ml of mixed sea water+50 ml of treating water (a)
450 ml of mixed sea water+50 ml of treating water (b)
450 ml of sea water+50 ml of treating water (a)
450 ml of sea water+50 ml of treating water (b)
450 ml of effluent water+50 ml of treating water (b)+50 ml of gel (26.5 ppm of Al)
450 of mixed sea water+50 ml of treating water (b)+50 ml of gel (26.5 ppm of Al)
450 ml of sea water+50 ml of treating water (b)+50 ml of gel (26.5 ppm of Al)

The treating time was 60 minutes for each level. When 60 minutes had passed after the mixture, the concentration of each ion remaining in each filtrate was measured and the deposit was washed down into the original beaker by using a wash bottle to measure the concentration of each ion in the deposit.

Results of Measurement

The results of the measurements are shown in the graphs of FIGS. 7 to 14. In spite of the movement of pH toward the acidic side, the cations of CaO, MgO, $Al_2O_3$, $Fe_3O_4$, ZnO and the like deposited and, especially in a weak acidic state, ions producing hydroxides reacted acutely enough to rapidly deposit $Al_2O_3$, $Fe_3O_4$, ZnO and the like. On the alkaline side, ions producing hydroxides such as MgO and CaO gradually became deposits in a long time. The removal of P and N had a close relation with the deposition of these cations, and especially on the acidic side P and N acutely combined with a trace amount of (1 to 5 ppm) cation which produces hydroxides, thereby being removed from the water system. It is therefore essential for the removal of P and N from water that an appropriate amount of cation is contained in the treating water and/or the untreated water, and that an appropriate amount of proton and magnetic flux density exist. If an appropriate amount of cation does not exist in the treating water and/or the untreated water (water being treated), it is possible to completely remove P by adding about 1 to 5 ppm of Al ions (Fe ions, etc.) to the treating water and/or the untreated water. (It is difficult to separate not more than several ppm of cations as hydroxides by an ordinary alkali treatment).

If an appropriate amount of cation is contained in the treating water and/or the water being treated, flocs are generated sufficiently rapidly to achieve the object even if the pH reaches 6.5 to 6.8 after the dilution.

It has been made clear that it is possible to average the distribution of a magnetic field to a great extent by the diluting treatment. In the following graphs and tables, the symbol "A" represents effluent water, "B" mixed sea water, "a" treating mixed water consisting of effluent water and sea water, "b" treating effluent water, and "gel" Al gel.

EXAMPLE 5

Behaviour of P and N Depending upon the Dilution and Aging Period for Each Level As the water being treated, the mixed sea water consisting of sea water and the effluent water of Ebuna Housing Development mixed in a ratio of 1:1 and the effluent water of Ebuna Housing Development were used.

As the treating water, "a": the mixed sea water treated in the same way as in Example 4, "b": the treated effluent water of Ebuna Housing Development, and "c": the effluent water of Ebuna Housing Development treated by adding an amount equivalent to 2.65 ppm of Al gel were used.

The combinations of the experimental materials and the experimental method are as follows.

| No. | Water being treated | Treating water | Dilution | Aging period |
|---|---|---|---|---|
| 1 | Mixed sea water 450 ml | a. 50 ml | × 10 | 0–1 day–7days–14 days |
| 2 | Mixed sea water 485 ml | a. 15 ml | × 30 | " |
| 3 | Mixed sea water 490 ml | a. 10 ml | × 50 | " |
| 4 | Mixed sea water 495 ml | a. 5 ml | × 100 | " |
| 5 | Effluent water 450 ml | b. 50 ml | × 10 | " |
| 6 | Effluent water 485 ml | b. 15 ml | × 30 | " |
| 7 | Effluent water 490 ml | b. 10 ml | × 50 | " |
| 8 | Effluent water 495 ml | b. 5 ml | × 100 | " |
| 9 | Effluent water 450 ml | c. 50 ml | × 10 | " |
| 10 | Effluent water 485 ml | c. 15 ml | × 30 | " |
| 11 | Effluent water 490 ml | c. 10 ml | × 50 | " |
| 12 | Effluent water 495 ml | c. 5 ml | × 100 | " |

The samples having the above-described combinations were put into the respective 500-ml conical beakers to carry out aging test.

In the analysis, the flocs generated were filtered through a GF-F filter and the T.P. and T.N. remaining in the filtrate were measured so as to examine the effective kind of the treated water, the effective diluting time, and the aging effect.

Figure 15:
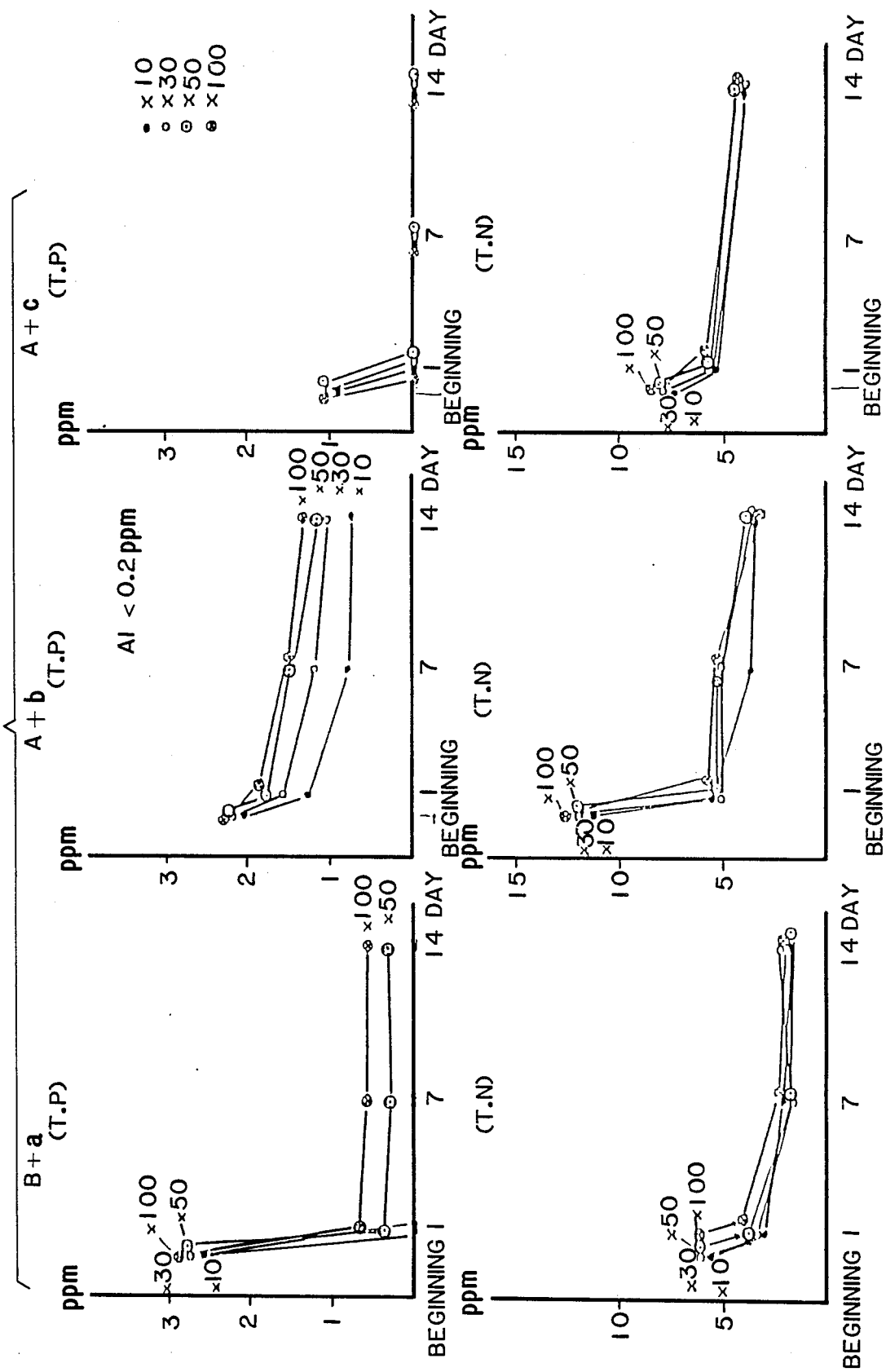
FIG. 15 is graphs showing the behaviour of P and N depending upon the degree of dilution and aging period for each kind of water being treated in Example 5.

The results are shown in FIG. 15.

1. In the case of mixed water+treating mixed sea water, even 100-time dilution exhibited good P and N removing effect, and the aging treatment also produced a good removing effect.

2. In the case of effluent water+treating effluent water, only 10-time dilution together with the aging treatment showed a P and N removing effect. This fact shows that the lack of a deposit derived from the lack of cations lowered the adsorbing and depositing capacity.

3. In the case of effluent water+treating effluent water added with Al gel water, even 100-time dilution exhibited a completely good P removing effect, because the amount of proton was small and an appropriate amount of cation was contained after the treatment in spite of the pH of 6.7 to 6.8 N removing effect was good, showing a tendency similar to the aging effect.

From these results it has been proved that it is possible to further increase the degree of dilution if the water being treated and/or the treating water contains or is caused to contain an appropriate amount of cation and an appropriate amount of proton is provided for flocculating the cations.

EXAMPLE 6

Figures 1, 16:
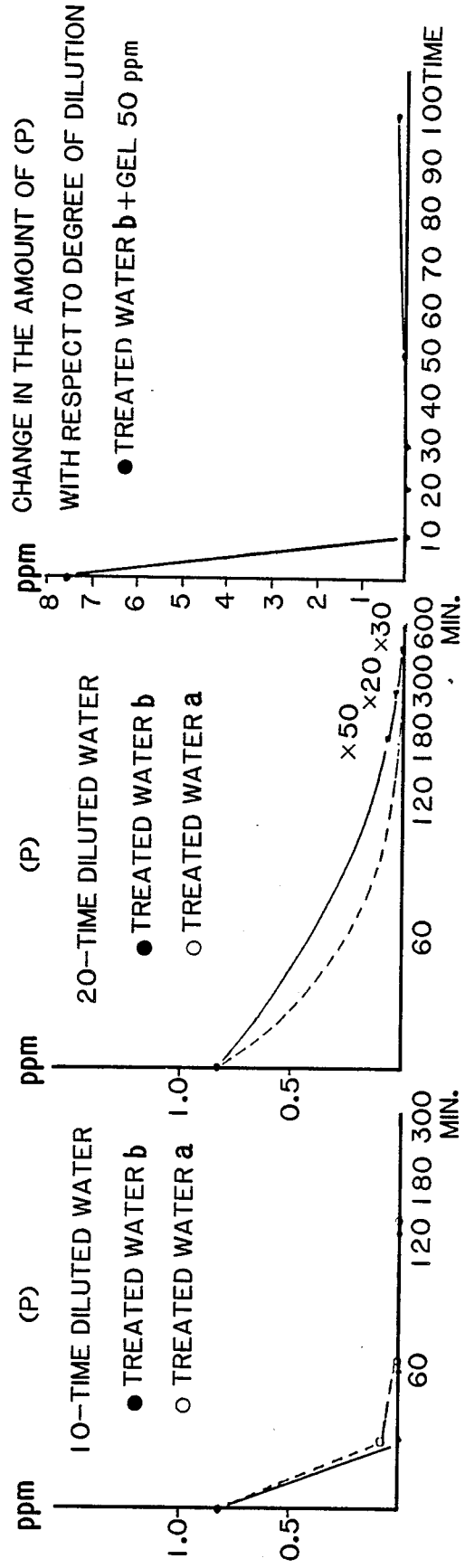
Figures 2, 16:
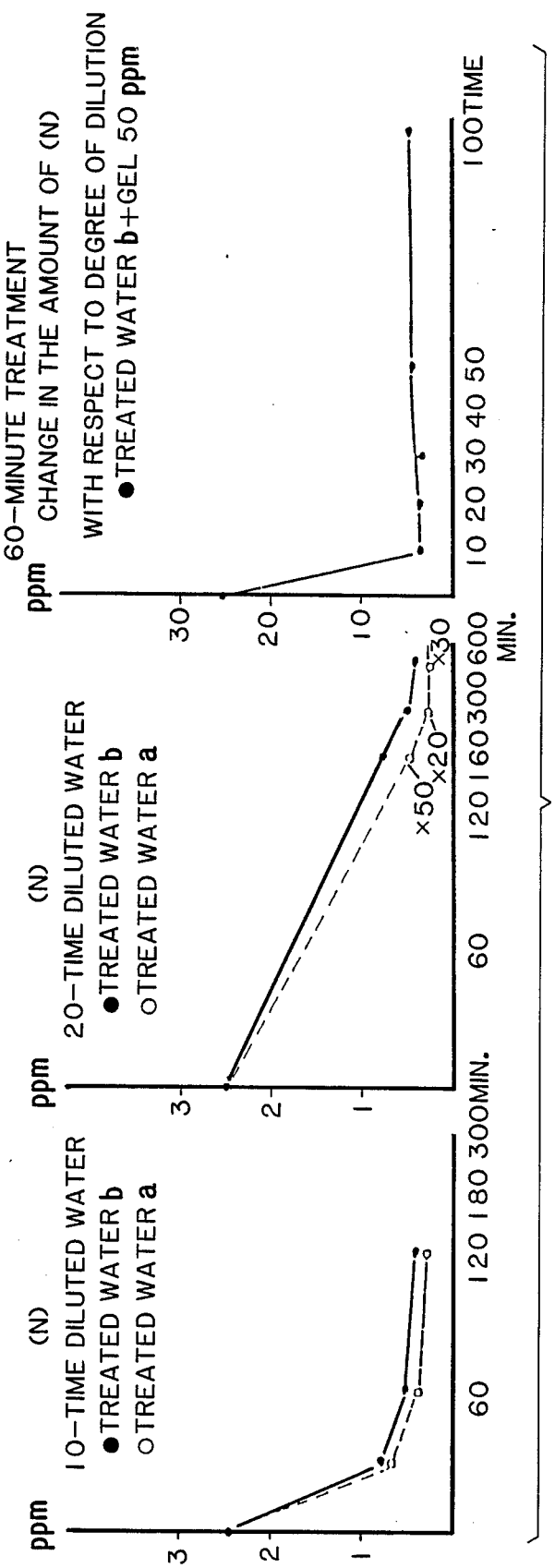
Figures 1, 17:
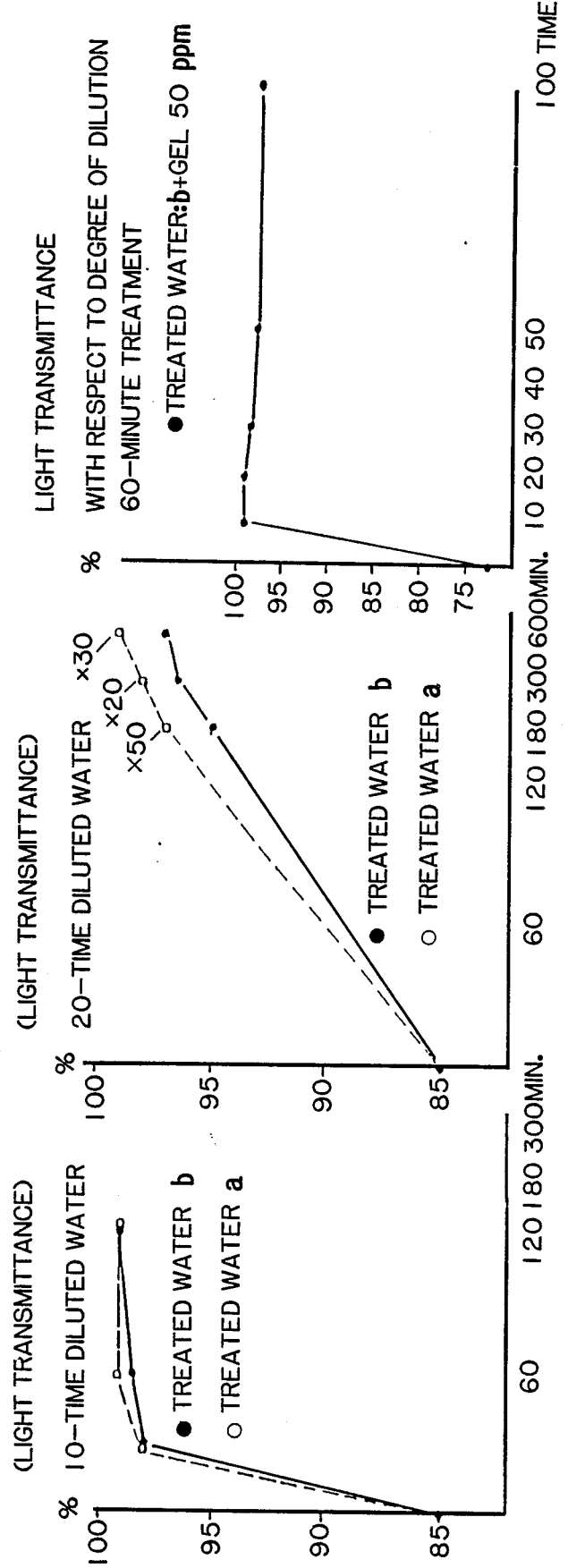
Figures 2, 17:
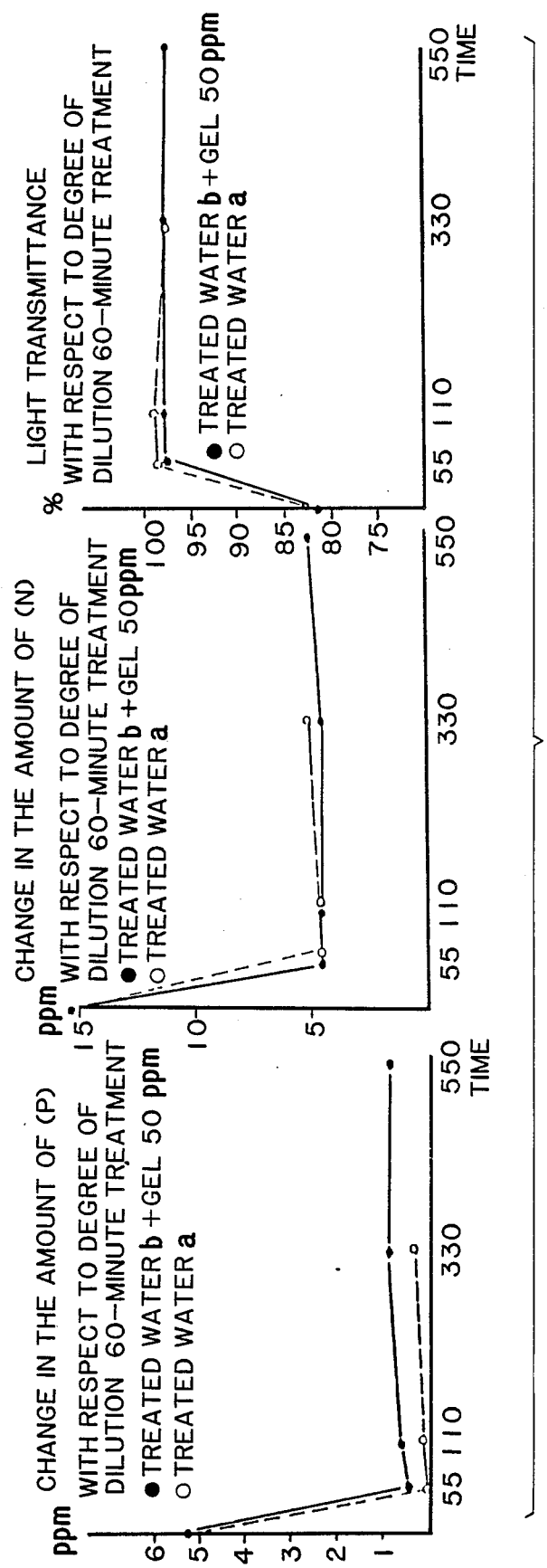

Behaviour of P and N and the Light Transmittances of the Water of a Fish Pond Subjected to the Batch Dilution Treatment The water of a fish pond was used as the water being treated, and as the treating water, "a": effluent water+-sea water treated in the same way as in Example 4, "b": the water of the fish pond treated in the same way as in Example 4, "b+gel": the water of the fish pond added Al gel thereto and treated in the same way as in Example 4 were used. The changes with time in the amounts of P and N and the light transmittances in the case of the degrees of dilution of 10 times and 20 times are shown in FIGS. 16 and 17 together with the behaviour of P and N and the light transmittance with respect to the degree of dilution.

EXAMPLE 7

Figure 6:
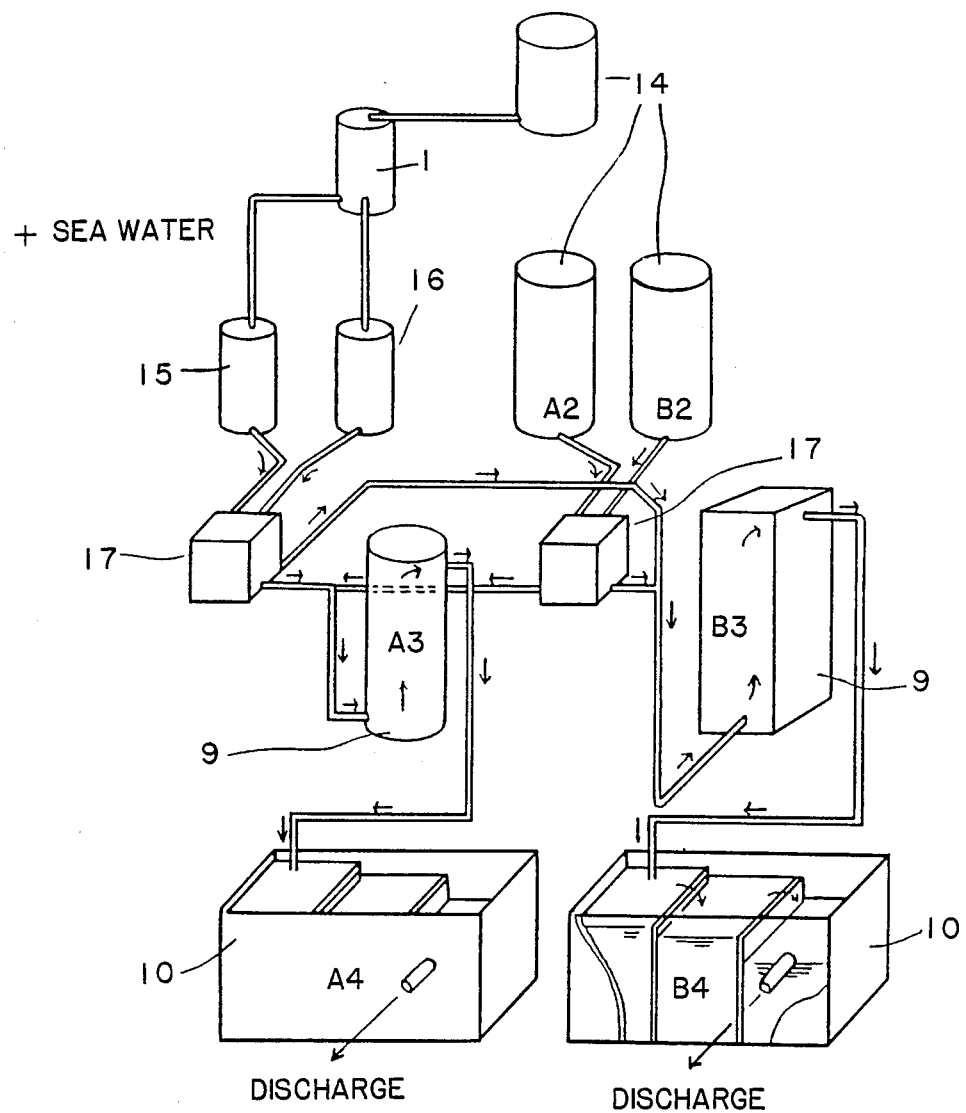
FIG. 6 schematically shows a test plant adopting the diluting method shown in FIG. 5.

Behaviour and the Light Transmittances of the Water Subjected to Continuous Flowing Dilution Treatment FIG. 6 schematically shows a test plant for treating water by diluting the water using the treated water of the present invention. The reference numeral (14) represents an untreated water tank, (1) the treating tank using cristobalite and a magnetic field, (15) a sea water and treating water tank, (16) a treating water tank, (17) a constant delivery pump, (9) the mixing tank and (10) the deposition tank.

Figures 1, 18:
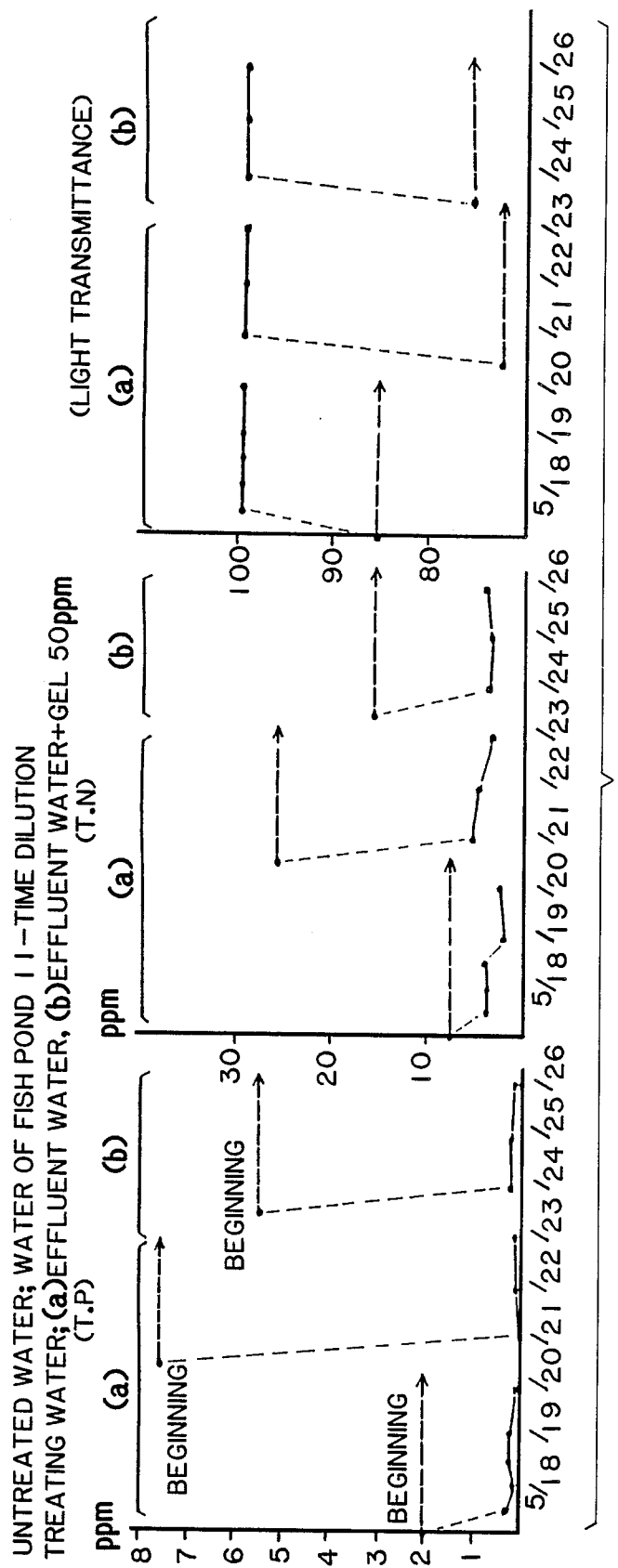
Figures 2, 18:
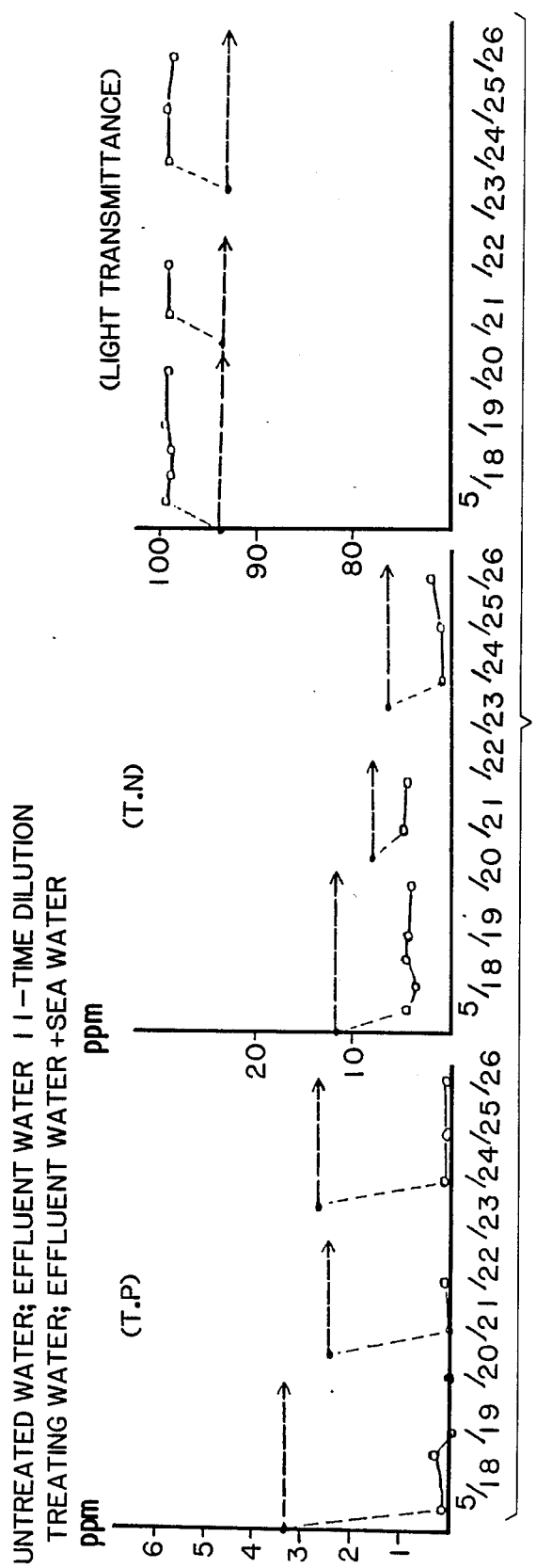

By using the test plant adopting a diluting method shown in FIG. 6, a water being treated and a treating water were continuously were continuously flown at a rate of 1,500 ml/hr and 150 ml/hr, respectively. As the water being treated, the water of a fish pond and the effluent water (effluent water at the seivage disposal plant of Ebuna Housing Development) were used, and as the treating water, a: effluent water+sea water, b: effluent water, and b+gel: effluent water+Al gel treated in the same way as in Example 4 were used. The water being treated and the treating water were naturally mixed in the mixing tank to produce flocs and precipitate a deposit in the deposition tank. The supernatant liquid was caused to flow out to obtain the treating water, and the flowing values were measured. The value obtained by the analysis at the time of collecting each water was used as each of the initial values. The satisfactory results such as those shown in the graphs in FIG. 18 were obtained for the removal of P and N and algae (substituted by the light transmittance). The results of the experiment on the continuous flowing dilution treatment are shown in the following table.

|  |  | Water of fish pond (untreated water) | Treated water |
|---|---|---|---|
| Hydrogen ion concentration |  | 7.3 | 6.1 |
| (Water temperature) | °C. | 20 | 20 |
| Suspending substance | mg/l | 400 | 2.0 |
| Chemical oxygen demand (COD) | mg/l | 32 | 7.2 |
| Biological oxygen demand (BOD) | mg/l | 137 | 2.5 |
| Total phosphour | mg/l | 13.8 | 0.02 |
| Total nitrogen | mg/l | 9.24 | 2.56 |
| Visibility | degree | 5.2 | >30 |
| Chlorophyll | mg/m$^2$ | 1,830 | 3.3 |
| Algae | number/ml | 37 × 10$^5$ | 2,100 |
| Temperature for collecting water | °C. | 26.0 | 26.0 |

The treating water obtained by the experiment of the continuous flowing dilution treatment in Example 7 was diluted again with the water of the fish pond (×11×5 to ×11×50), and flocs were generated in the same way. The Total-P and Total-N remaining in the supernatant liquid and the light transmittance were measured, whereby the effect remaining in the treating water diluted by 11 times was confirmed. From the results shown in the lower part of FIG. 17, it has been proved that the diluted waters have an adequate remaining power.

As to the degree of dilution, the treating water of the effluent water+50 ppm gel which had been diluted by 550 times was effective, and the treating water of the effluent water+sea water which had been diluted by 330 times was effective.

From the above-described examples the following conclusions have been obtained:

1. When an element has a lower pH for producing hydroxides, it has the higher tendency for removal of ions, but even an element which produces hydroxides on the alkaline side exhibits a tendency for removal of ions although the treatment of the present invention is carried out on the weak acidic side.

2. The tendencies and effects shown in the method of the present invention are in common with the batch treatment and the continuous treatment.

3. In the treatment of the present invention, even a trace amount of cation becomes a deposit and this tendency is prominent particularly in an element which produces hydroxides in a low pH range.

4. In the treatment of the present invention, cations are first flocculated and a part of anions are adsorbed and flocculated by the cations at the time of flocculation of the cations, whereby the cations and a part of the anions are removed from a water being treated.

5. In the treatment of the present invention, it is essential that an appropriate amount of cation (preferably 1 to 5 ppm of Fe, Al, or the like, but the amount may be changeable and other cations may be used) is contained in a water being treated or a treating water. Therefore, in consideration of the treating time, method, the ion concentration in the water being treated, the ion concentration in the treating water, and the like, a trace amount of cation is added before treatment, if necessary.

6. In the treatment of the present invention, it is essential that a necessary amount of proton based on the amount of cation exists in the water being treated or the treating water (the amount of proton in the treating water is controlled by the treating time on the basis of the pH to be intended).

7. As a result of examining the purification treating capacity remaining in the treating water (diluted by 11 times) obtained by the continuous flowing treatment, it has been found that the protons in the treating effluent water have a remaining power until it is diluted by 50 times (diluted by 550 times in terms of the untreated water) and both the remaining ions and protons in the treating mixed sea water have a remaining power until it is diluted by 30 times. When the treating mixed sea water was diluted by 50 times, the ratio of the removed P was greatly lowered. This is considered to be because the amount of caution became insufficient due to the generation of the flocs.

8. From the comparison between the characteristic values before and after the continuous flowing test, a very effective method for the removal of BOD, T.P. algae and chlorophyll A has been found.

EXAMPLE 8

Figures 1, 7:
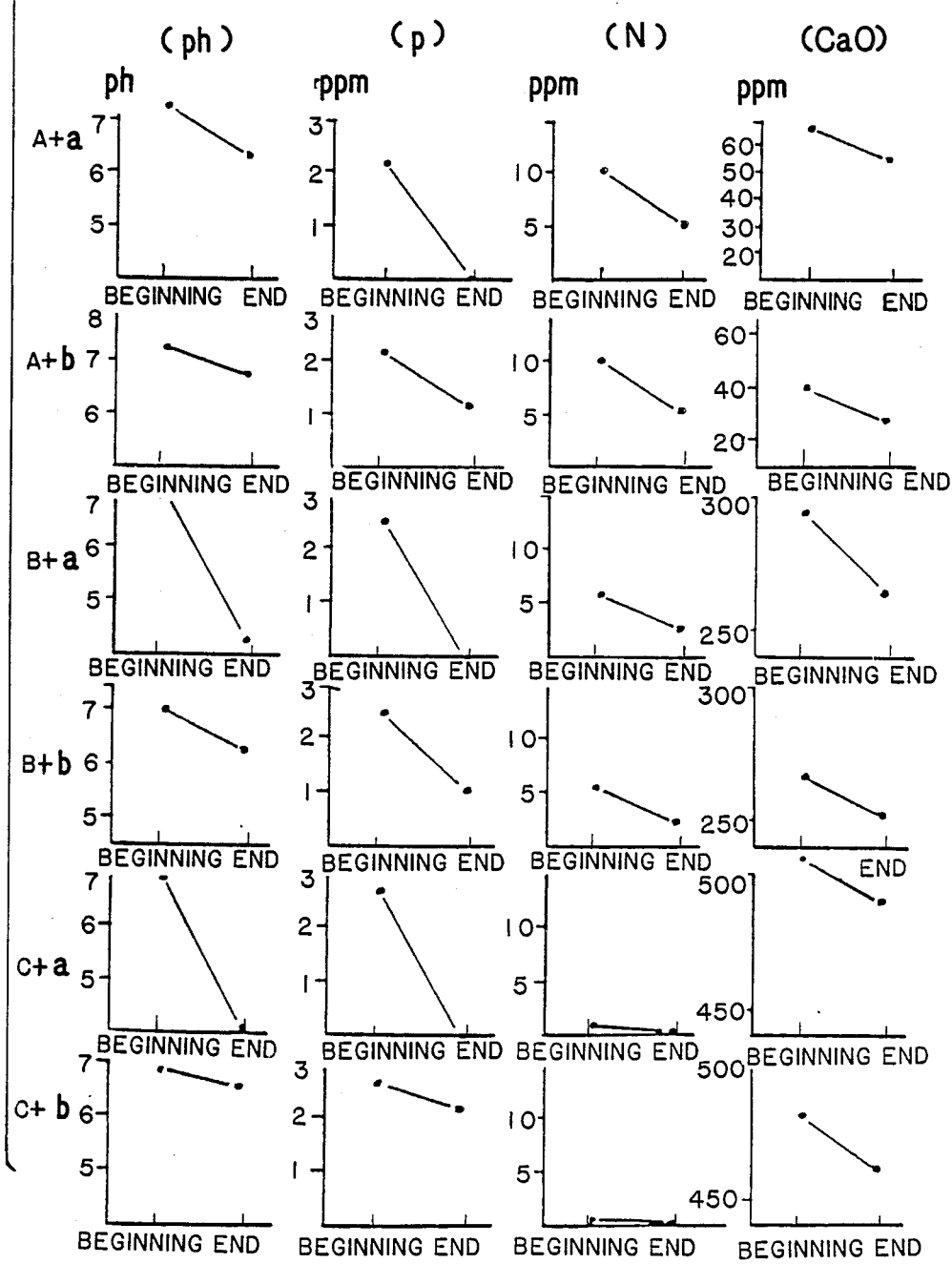

FIGS. 1 to 4 show embodiments of an apparatus of the present invention. FIG. 1 shows a water purifying apparatus which uses the water pipe (passage pipe) (1) itself as the treating tank. The coil (2) is wound around the water pipe (1) and energized to supply a magnetic field into the pipe. The magnetic flux density is determined by the number of turns of the coil. Cristobalite (6) was put into the water pipe (1) with an insulated coat (5) provided outside the coil (2). Untreated water (7) is caused to flow into the water pipe (2) and provided with a magnetic field by energizing the coil so as to purify the water. Air jet of 2 to 5 $kg/cm^2$ and/or water is jetted periodically from the cleaning nozzles (4) to wash the cristobalite and the like. The flocs are separated in the filtering tank, the deposition tank or an induction separation tank.

Figures 2, 7:
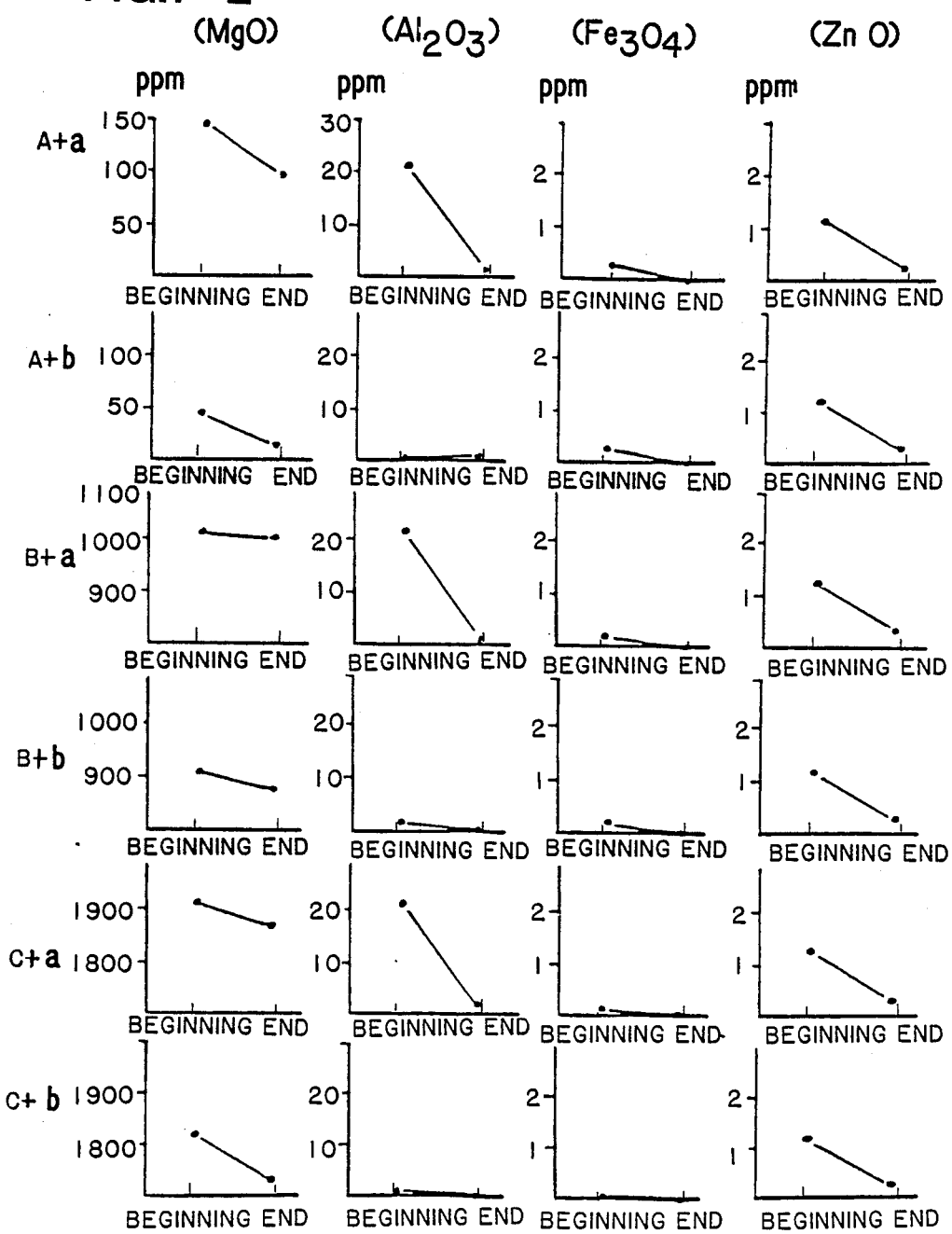
Figures 1, 8:
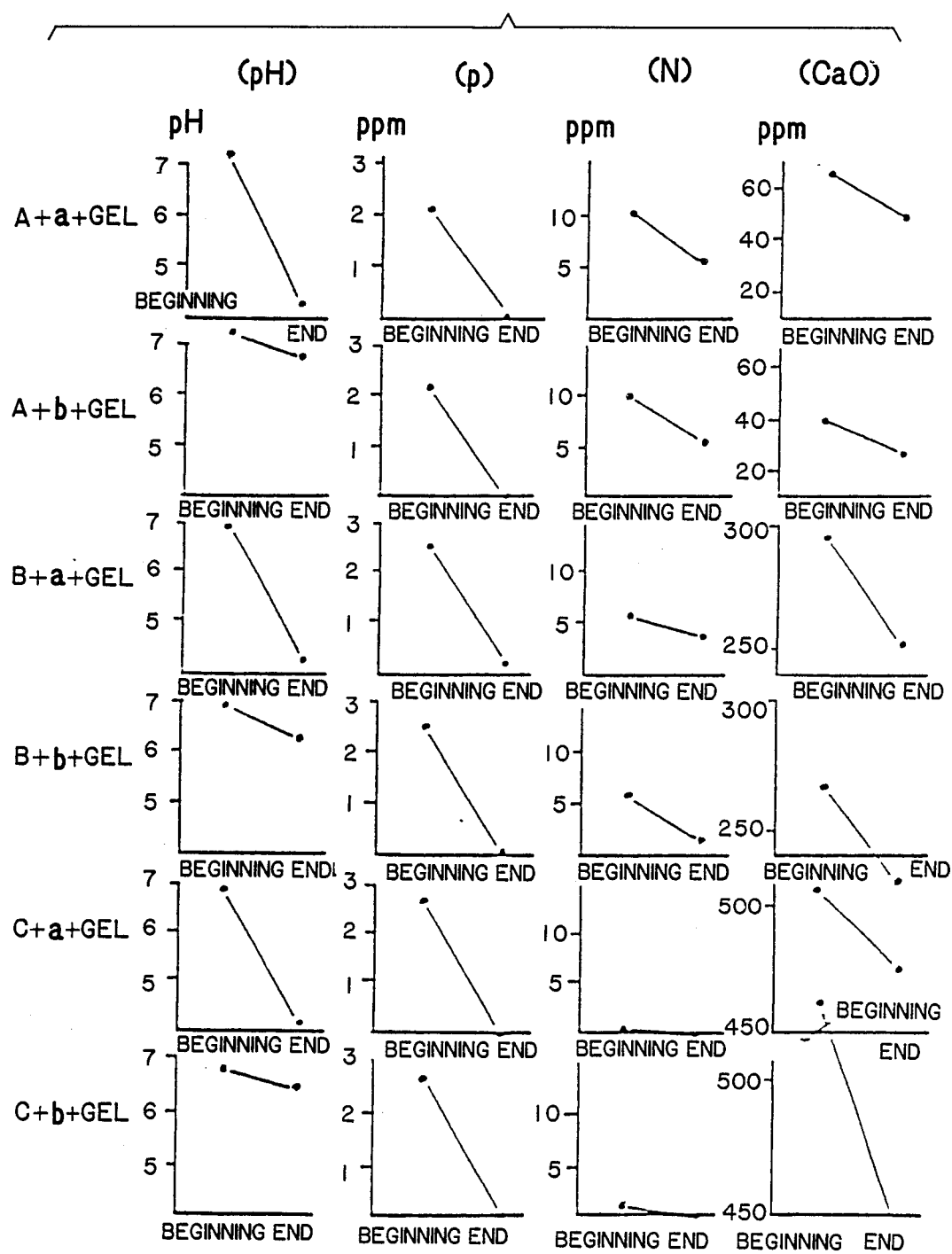
Figures 2, 8:
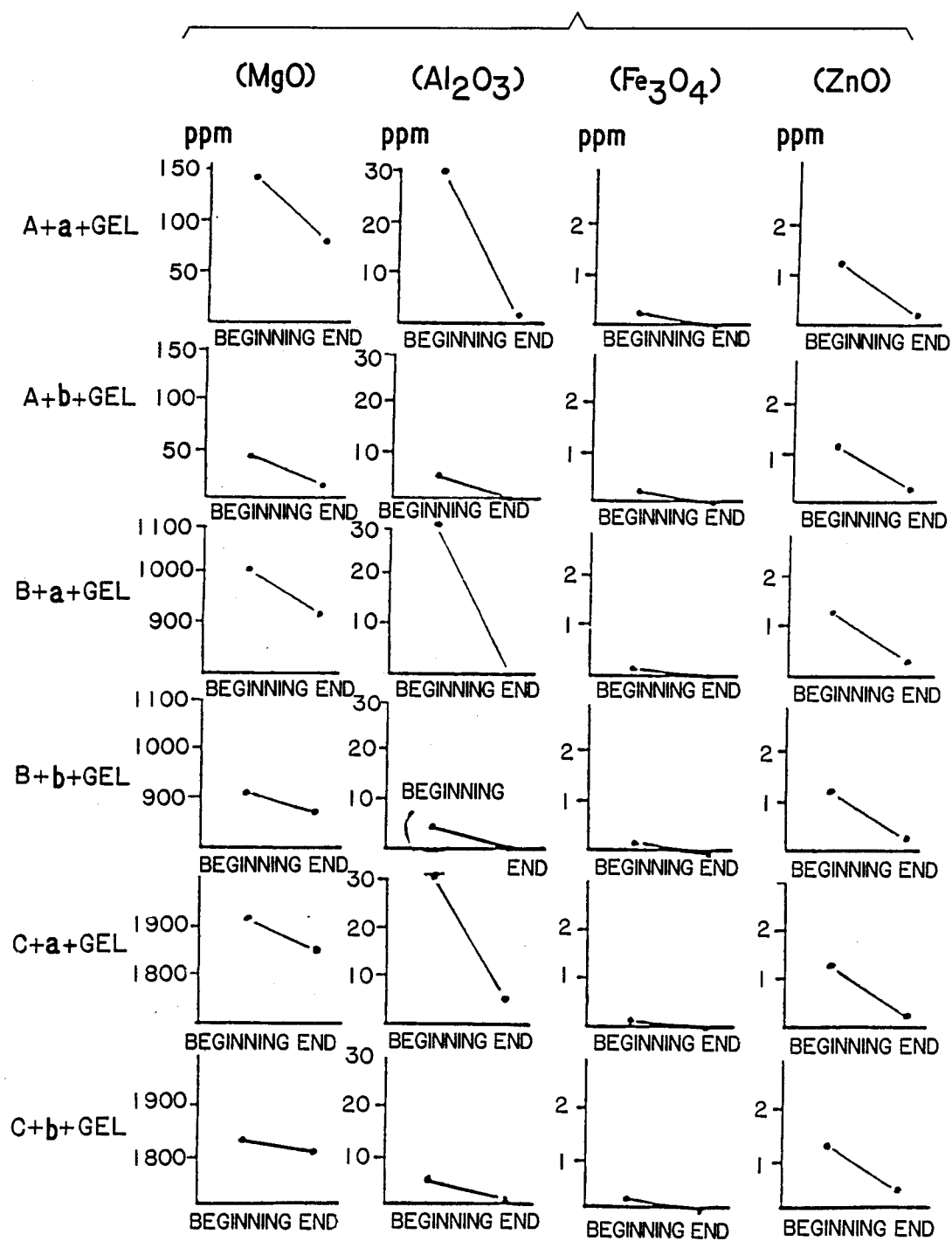
Figures 1, 9:
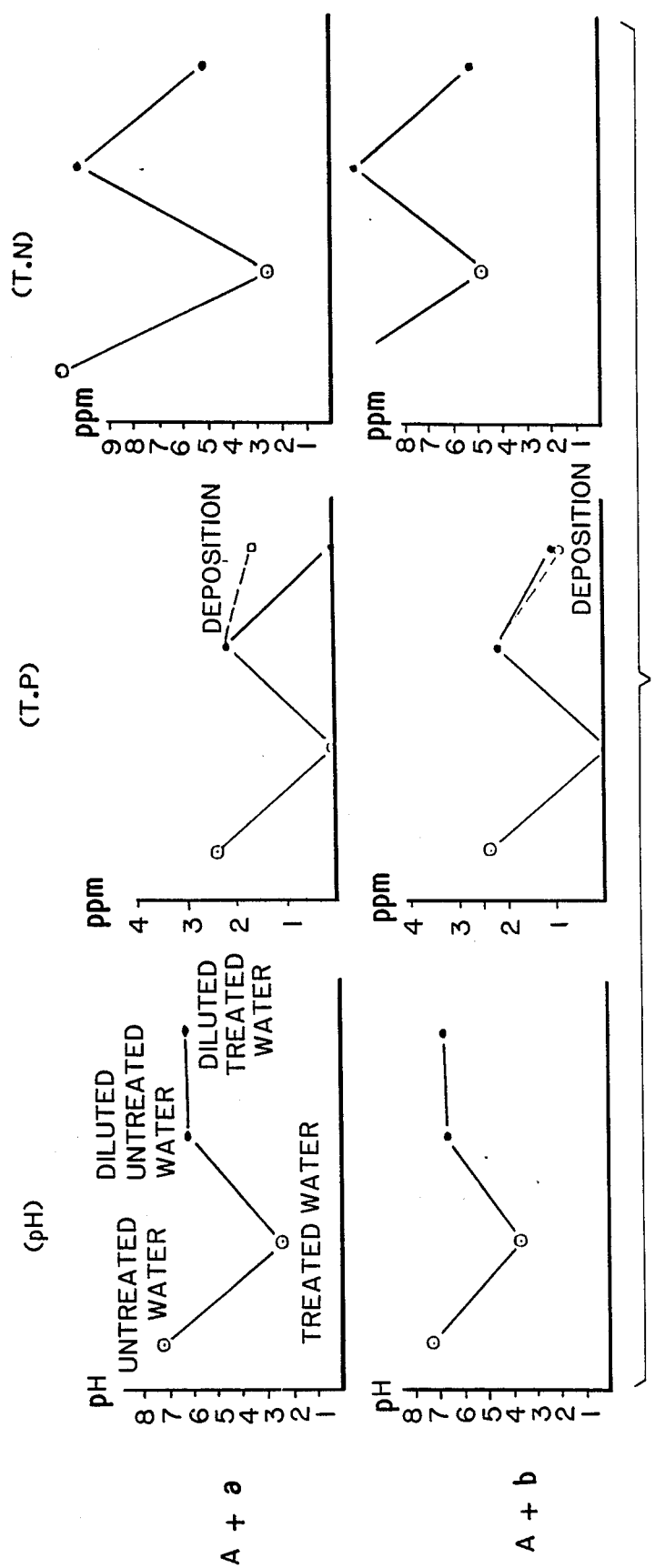
Figures 2, 9:
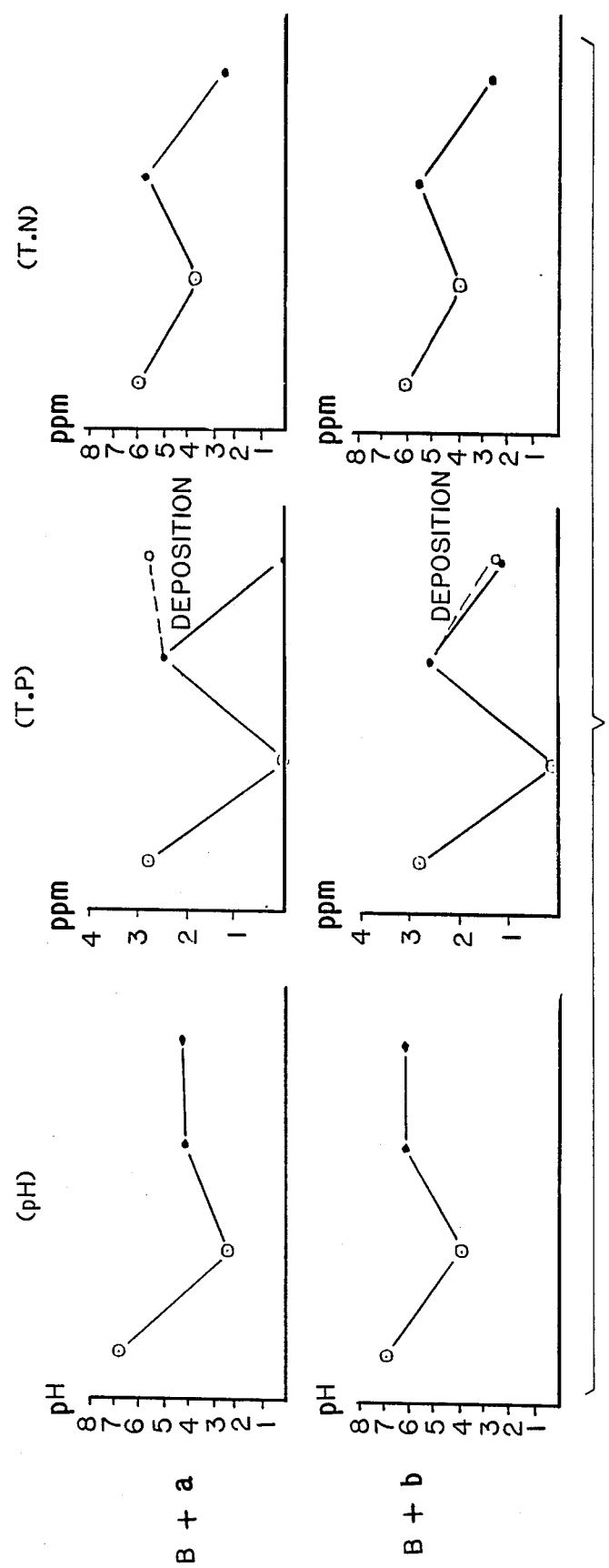
Figures 1, 10:
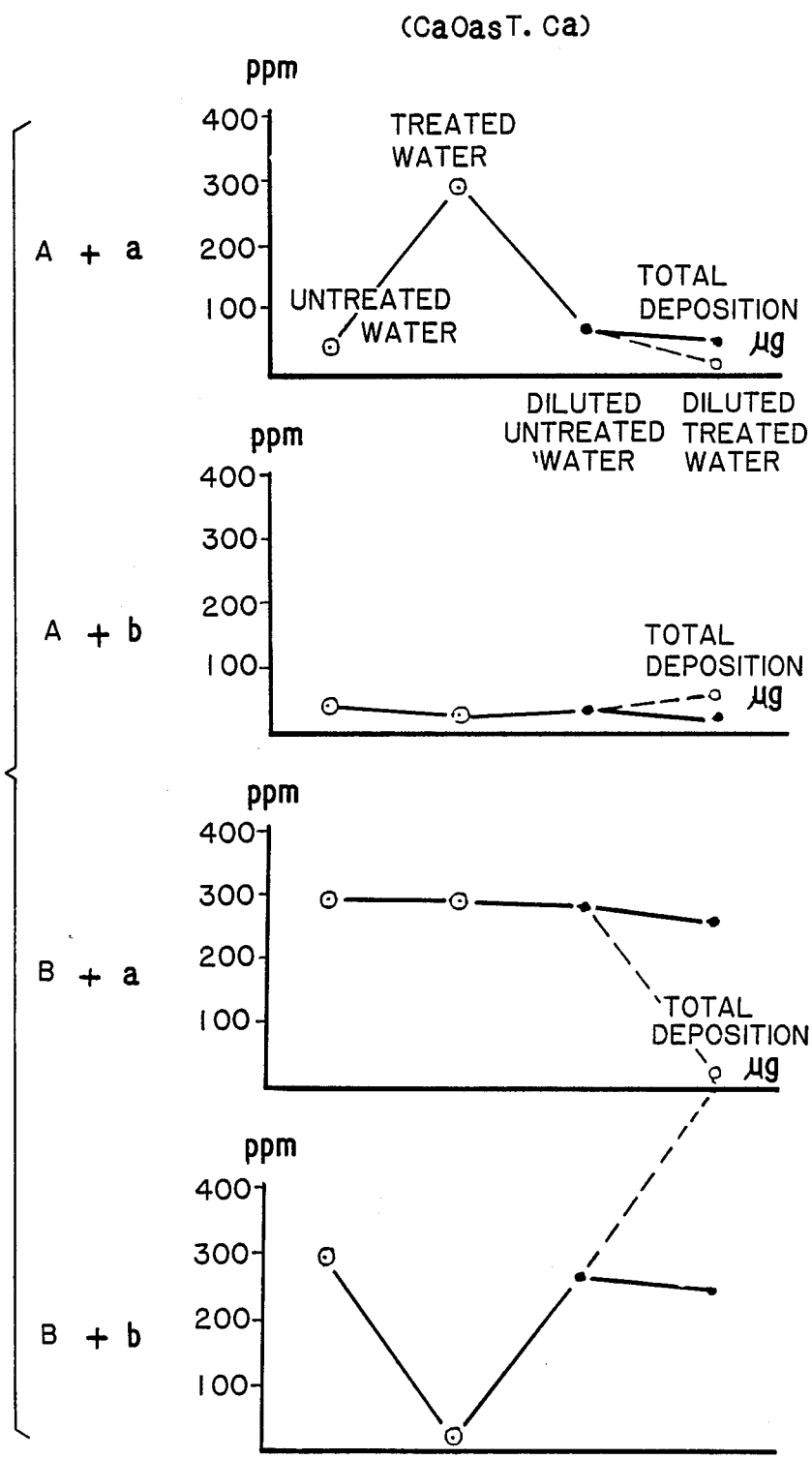
Figures 2, 10:
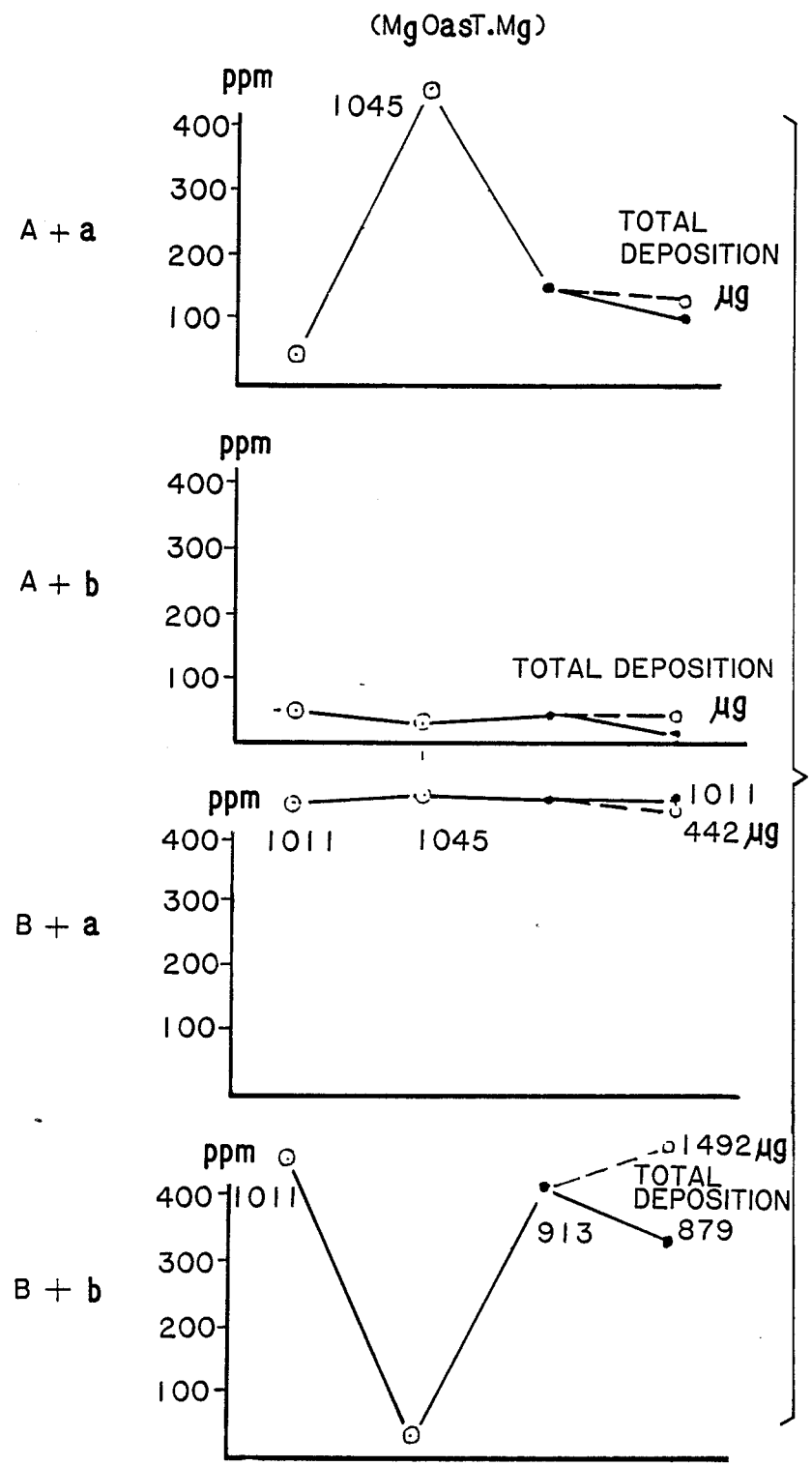

FIG. 2 shows a water purifying apparatus which uses a water flowing tank (1) as the treating tank. This is an example of an apparatus using discal magnets (3) (plastic binder+ferrite magnet). On the magnet (3) N poles and S poles are disposed alternately, the optimum space between the magnets being 2 to 3 cm. They are arranged such that the distribution of the magnetic flux is averaged as much as possible. The configuration, magnetic flux density and the like of the magnet (3) are freely selected so as to be suitable for a strong magnetic field. The untreated water (7) is caused to flow into the water flowing tank (1) to treat the water. Air jet of 2 to 5 $kg/cm^2$ and/or water is jetted periodically from the cleaning nozzles (4) to wash the flocs adhered to surfaces of the cristobalite (6) and the magnets (3). The flocs and colloids generated are treated in the same way as in FIG. 1.

Figures 1, 11:
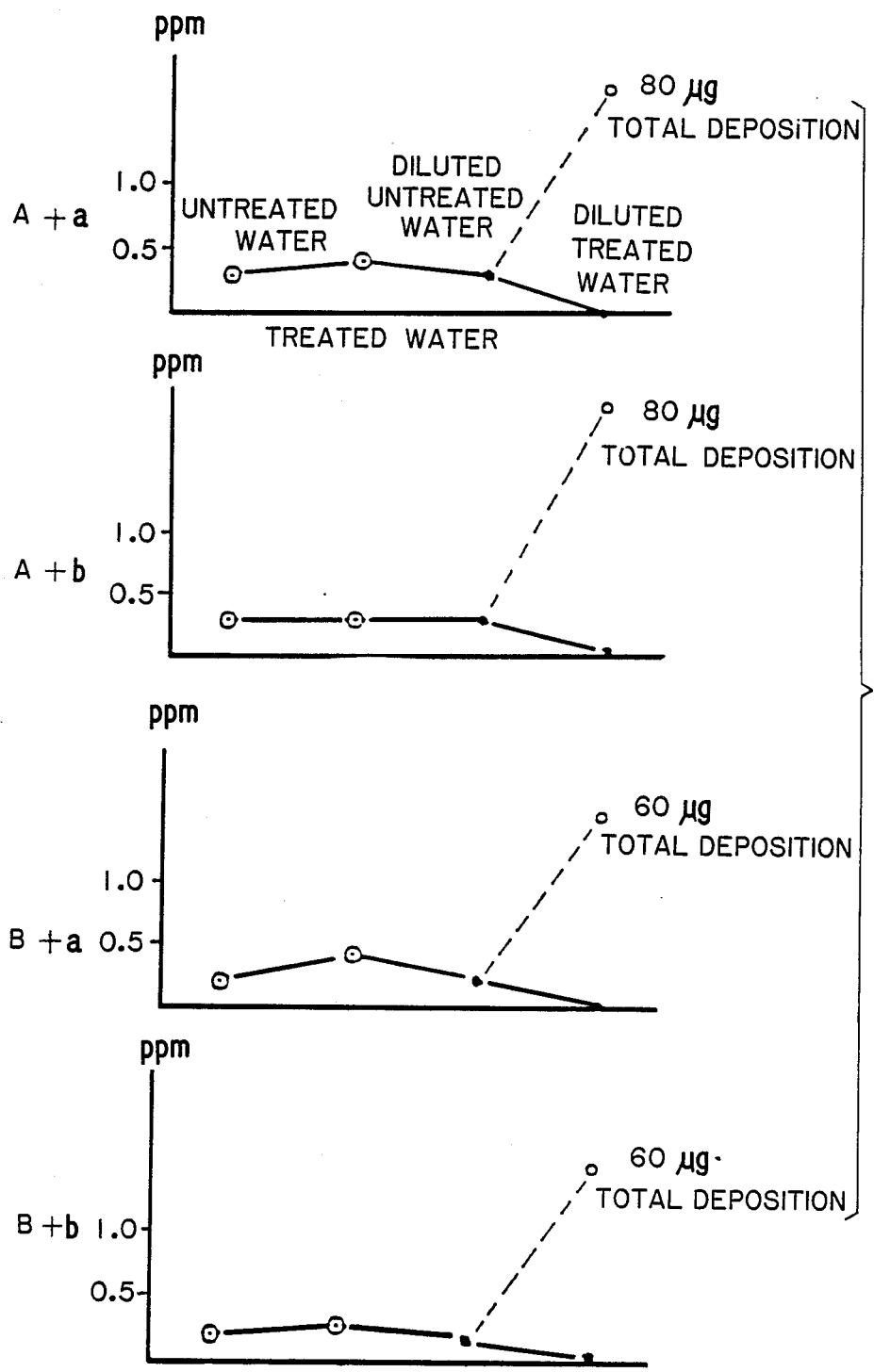
Figures 2, 11:
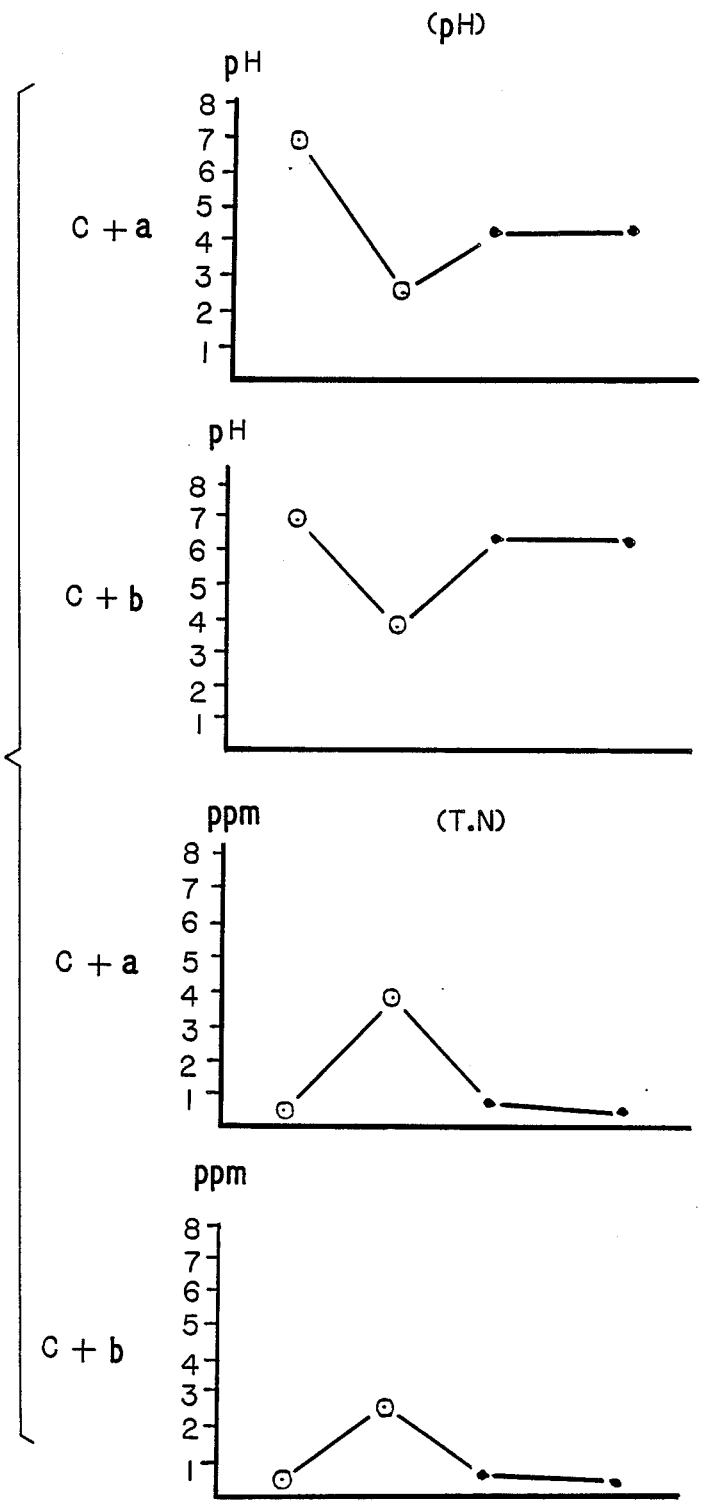
Figures 3, 11:
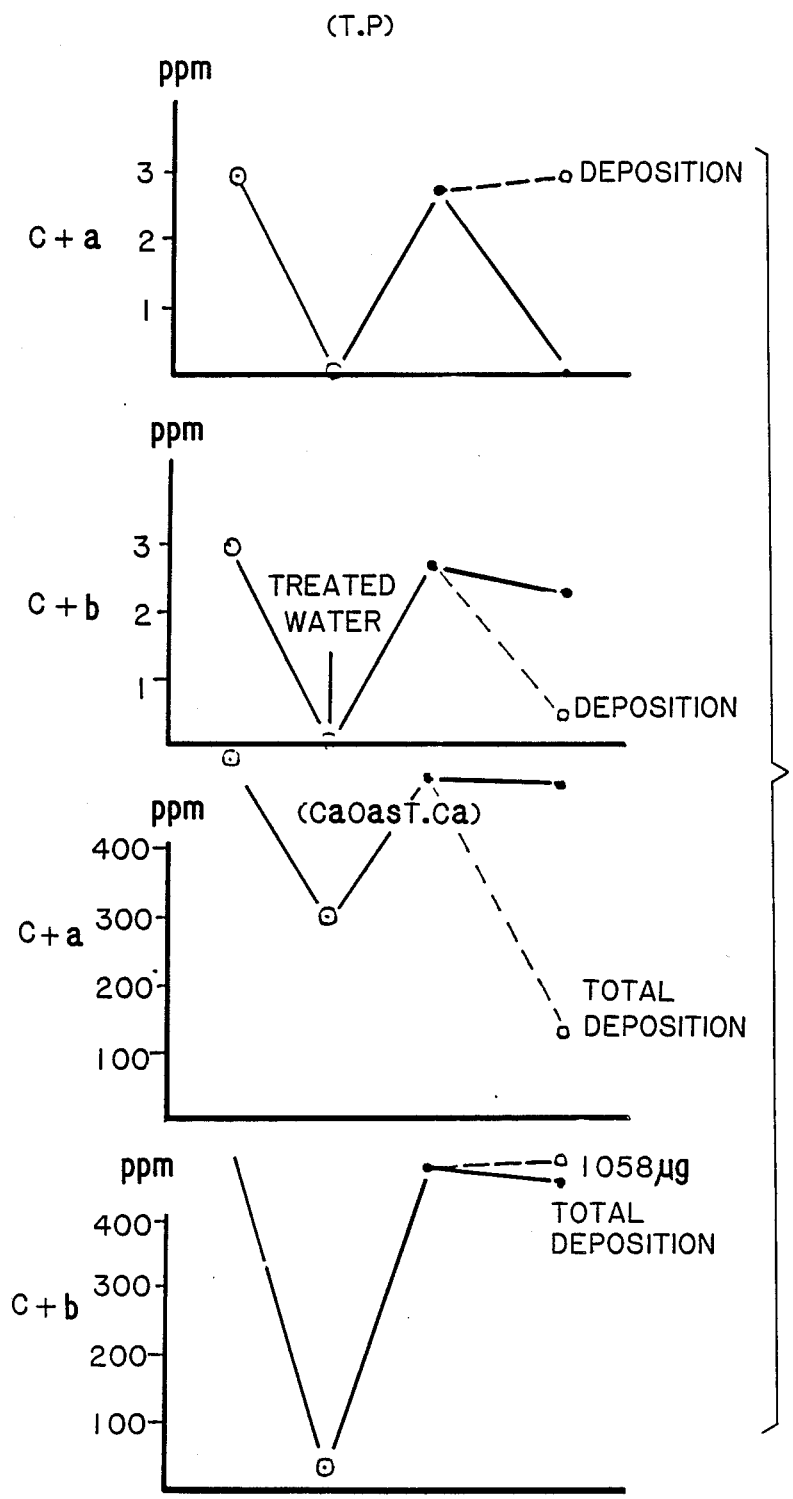
Figures 1, 12:
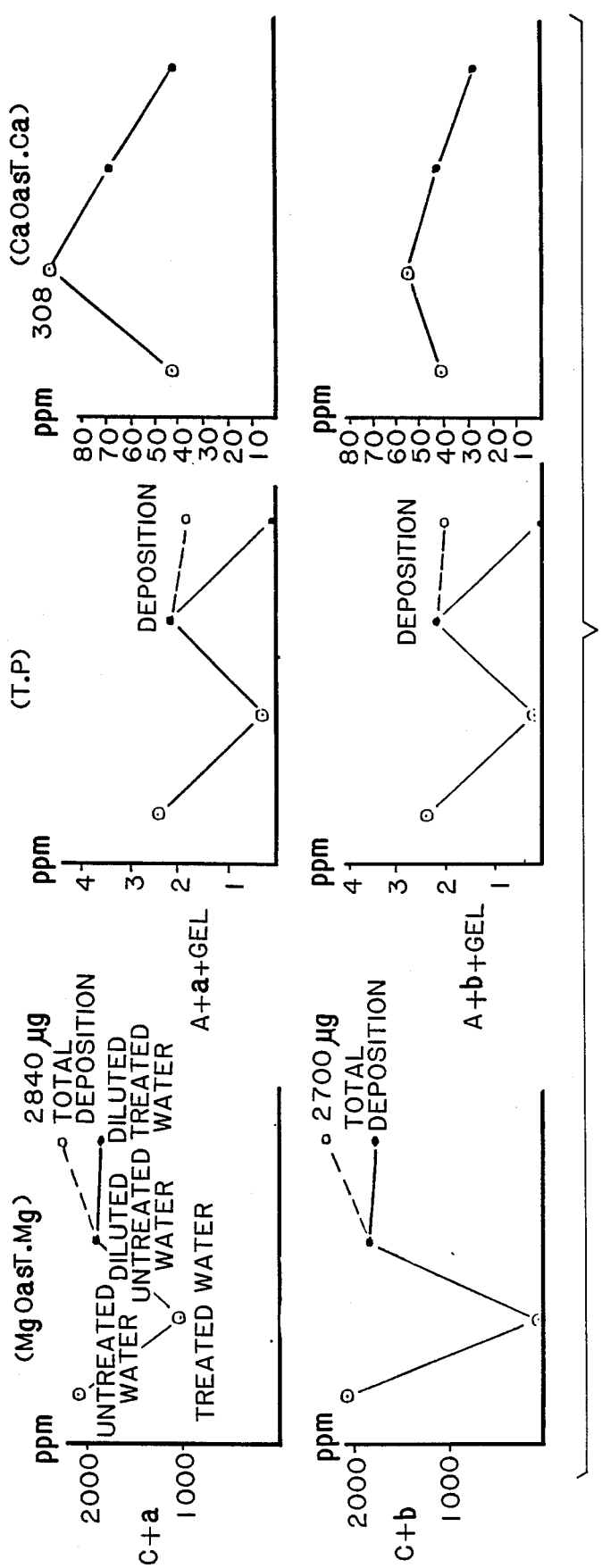
Figures 2, 12:
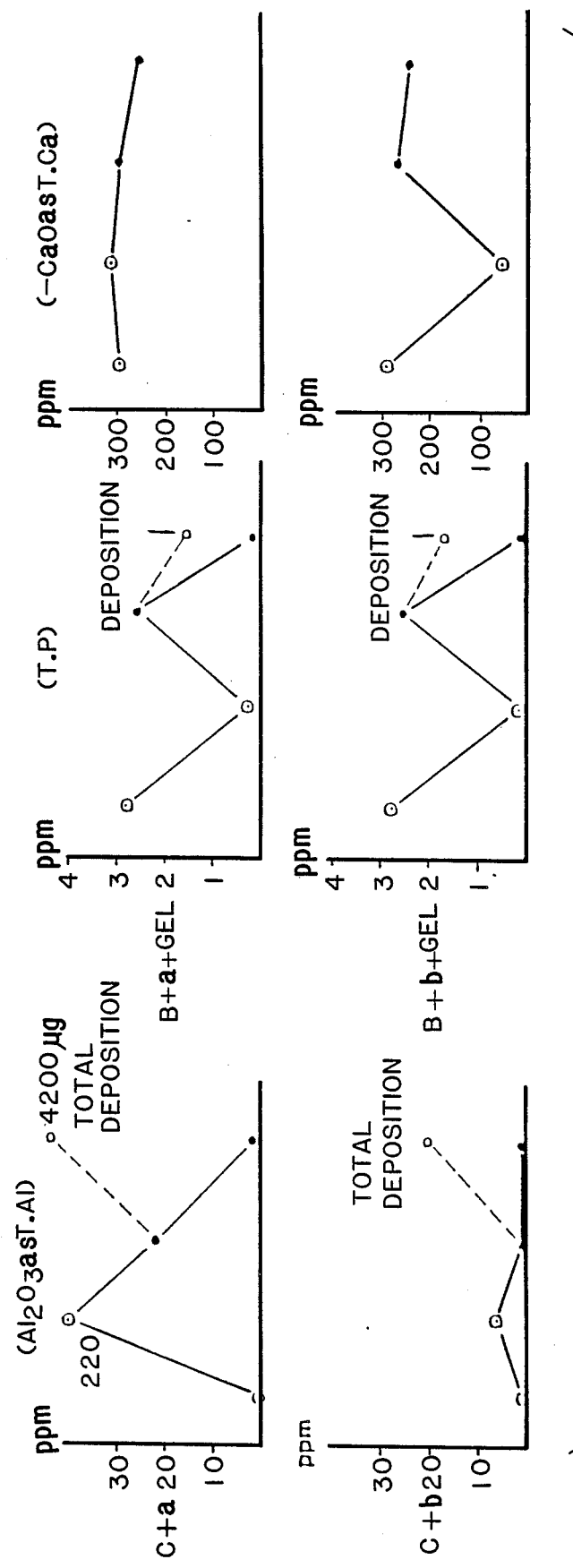
Figures 1, 13:
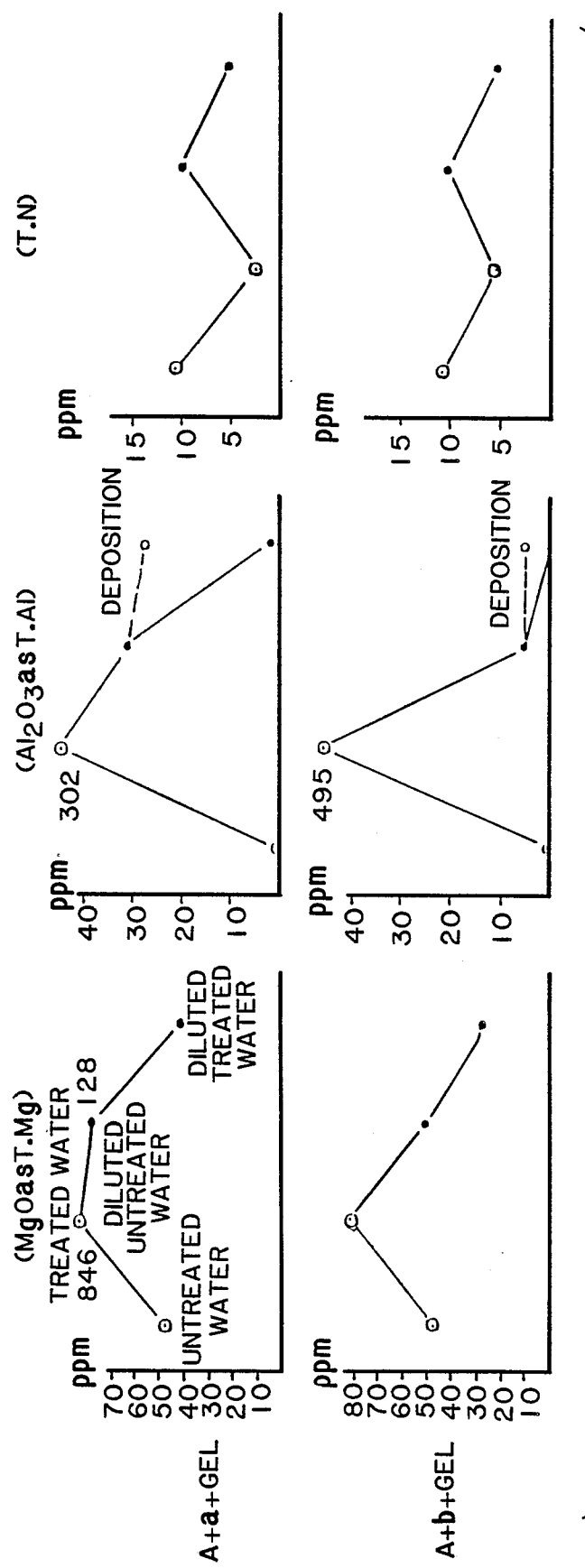
Figures 2, 13:
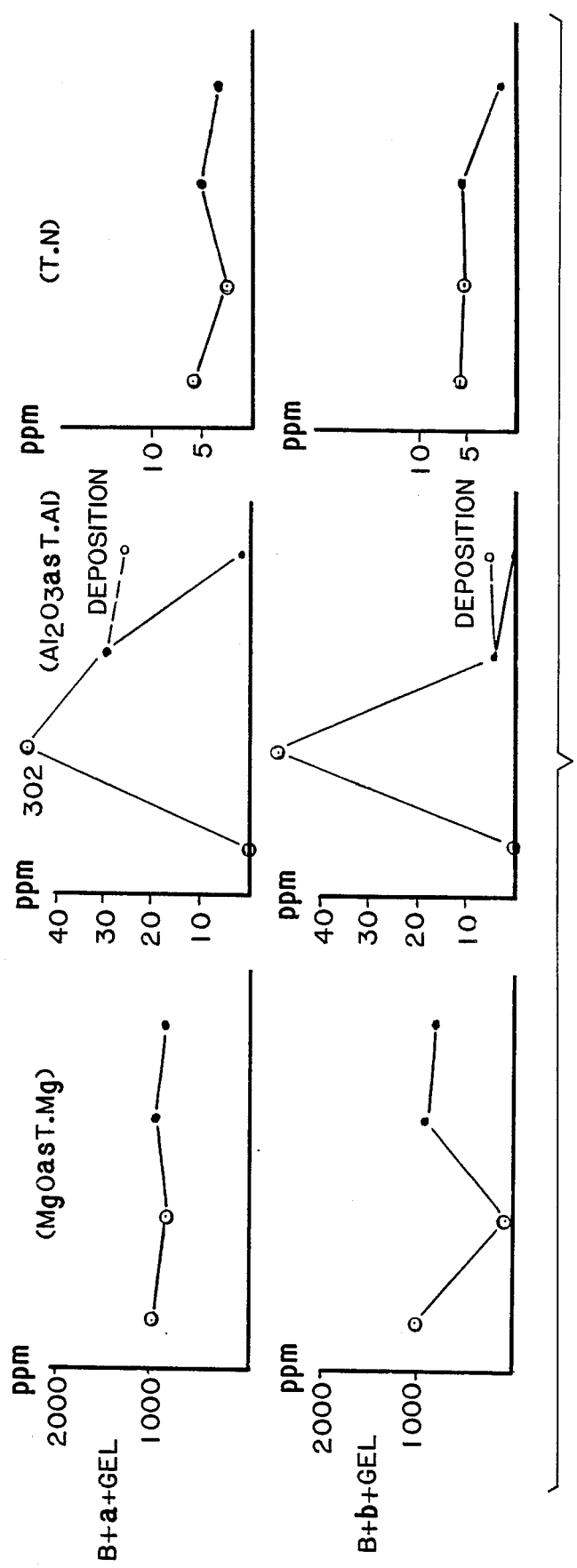
Figures 1, 14:
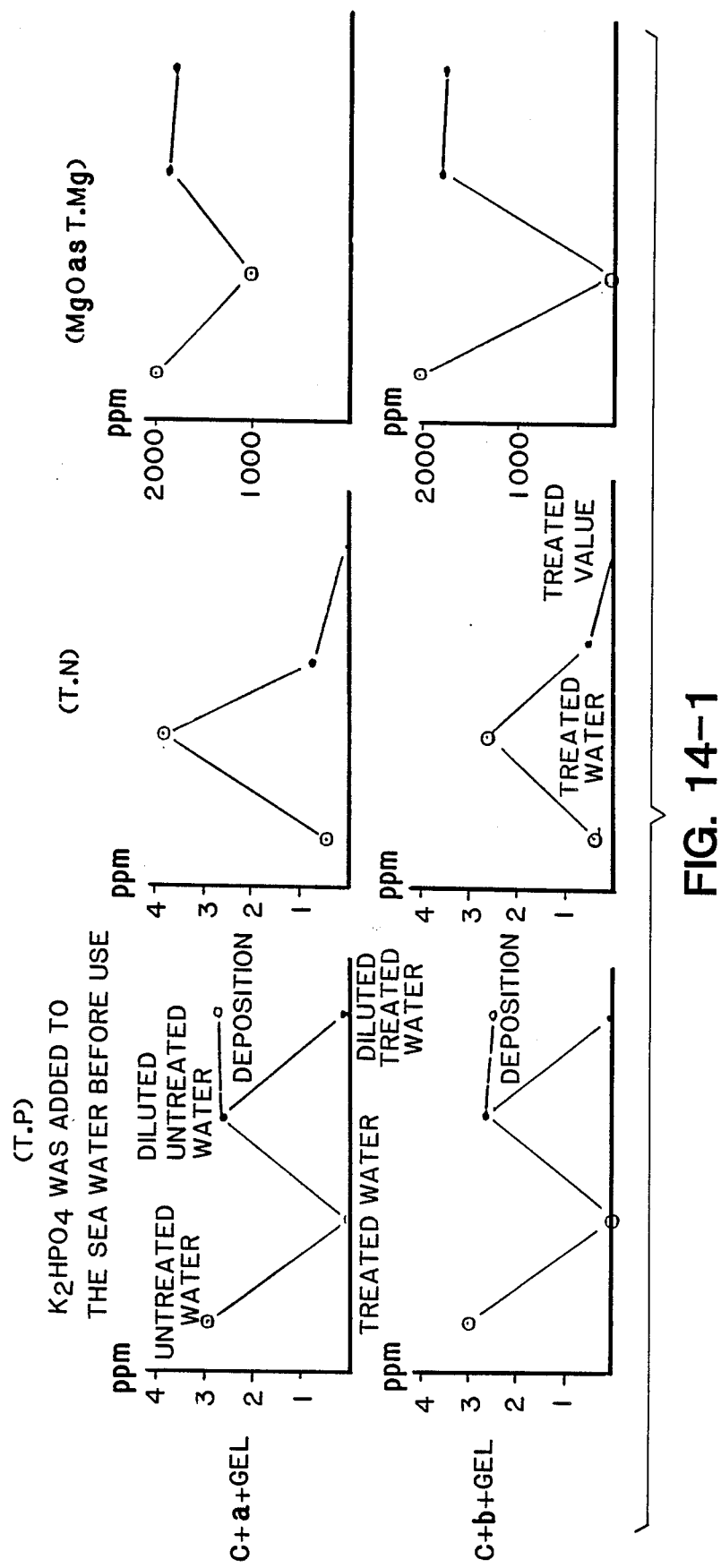
Figures 2, 14:
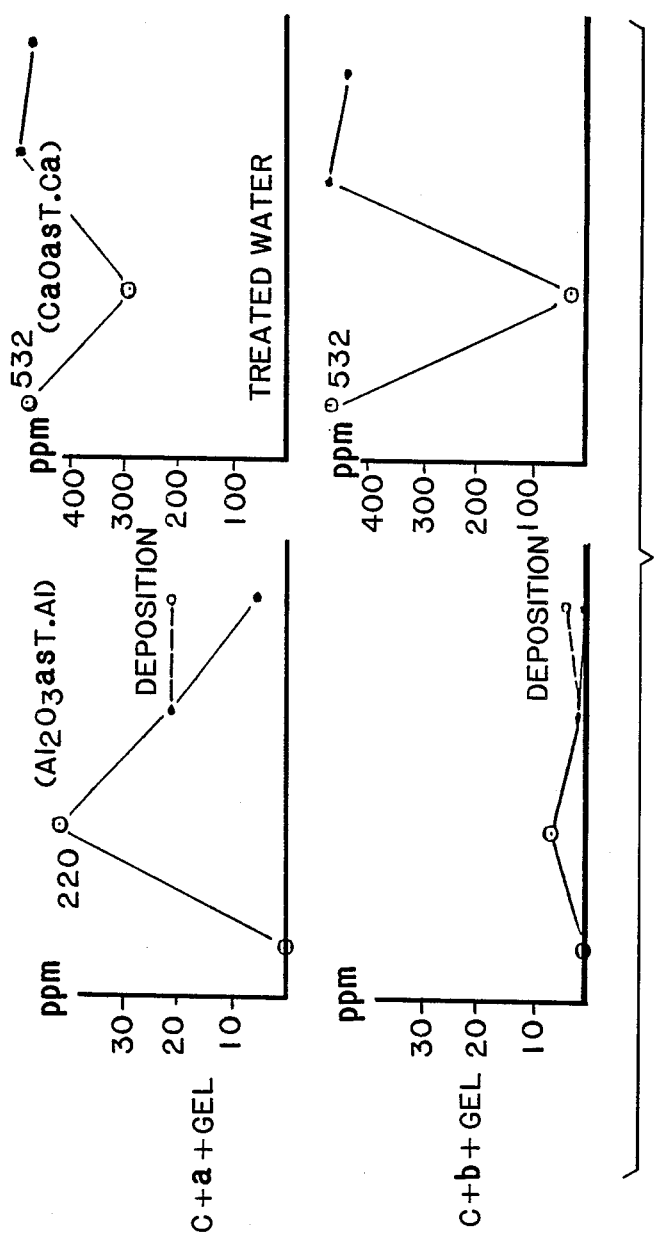

FIG. 3 shows a water purifying apparatus which uses the water flowing tank (1) as the treating tank and magnet sheets (3) with N poles and S poles disposed alternately thereon. The magnet sheet (3) is a magnetized plastic sheet, and it is possible to provide it with a freely selected magnetic flux density. The N and S poles are arranged in a reticulate state, the optimum space between the magnet sheets (3) being 2 to 3 cm. They are suitable for a low magnetic field and accelerate the growth of flocs. Many products having a strength of 180 to 160 Gauss are commercially available. Air jet of 2 to 5 $kg/cm^2$ and/or water is jetted periodically from the cleaning nozzles (4) to wash the flocs adhered to the surfaces of the cristobalite (6) and the magnet sheets (3). The flocs and colloids generated are treated in the same way as in FIG. 1.

FIG. 4 shows a water purifying apparatus which uses the water flowing tank (1) as the treating tank and the magnet sheets (3). The cristobalite is accommodated in rotatable cristobalite retaining cylinders (8) (cristobalite baskets) having a body portion consisting of a net. It is easy to remove the flocs adhered to the surface of the cristobalite by rotating the cristobalite retaining cylinders, as desired.

INDUSTRIAL APPLICABILITY

As is clear from the above explanation, according to the water treating technique of the present invention, it is possible to purify all the surrounding waters and to soften hard water in such a manner as to enable free management and control by a simple operation of selecting the amount of proton released and the strength of a magnetic field. Thus, the technique of the present invention has an economical effect of treating water at low equipment cost and running cost.

According to the present invention, it is possible to remove, reduce, vanish or deproliferate the cations such as P and N, a part of the anions, eutrophicated substances, chlorophyll, algae, bacteria and the like contained in the surrounding waters by selecting the amount of proton and the strength of a magnetic field. The present invention has various advantages such as those described below.

The treating method according to the present invention brings about a high practical value, because the inclusion of the secondary contaminating substances which are produced in carrying out the prior art using an adsorbent, flocculating agent, neutralizing agent, oxidizing agent, reducing agent or the like is very rare and the amount of sludge generated is very small.

Adoption of the water treating method of the present invention makes it possible to soften hard water and remove a trace amount of heavy metal and the like contained in factory effluent or the like.

The highly activated water obtained by the water treatment of the present invention restrains iron from melting out of the inner wall of a steel pipe, thereby preventing the generation of iron hydroxide. In the water treated by the present invention, the action of bacteria is suppressed, thereby preventing the generation of green algae and the like.

When an appropriate amount of Fe ion and/or Al is contained in waste water, both a flocculating effect with respect to green algae and a high adsorbing and depositing effect with respect to $NH_4$ type N, N in the organic form, $PO_4$ and the like are manifested.

By diluting the treated water obtained by the present invention with a water being treated and providing an appropriate memory magnetism and cations, if necessary, it is possible to remove the cations, a part of the anions, chlorophyll, algae and the like from the water being treated.

When purifying a water being treated by diluting the treating water therewith, purification of a large amount of water being treated is enabled by treating a small amount of water being treated, and since the treating method is complete and purification is possible without using any chemical agent or driving power, this method can display a large power especially in the purification of the water in a wide area.

The water treating technique of the present invention has the above-described many advantages in spite of a simple operation, an inexpensive equipment cost and a low running cost, and thus greatly contributes to this field.

What is claimed is:

1. A method of treating water containing undesirable substances, which comprises:
    soaking cristobalite in said water;
    controlling the pH of said water by means of said cristobalite to cause said undesirable substances to separate out of said water;
    subjecting said water, before, during or after said soaking of cristobalite, to a magnetic field; and
    removing the separated undesirable substances from said water.

2. A method according to claim 1, wherein said magnetic field has a strength of about 100 to 600 gausses.

3. A method according to claim 1, wherein said magnetic field has a strength of about 1,000 to 2,000 gausses.

4. A method according to claim 1, wherein said water being treated is water which contains chlorophyll, algae, or a mixture thereof.

5. A method according to claim 1, wherein said water being treated contains alkaline earth metal ions.

6. A method according to claim 5, wherein said alkaline earth metal ions are calcium or magnesium ions.

7. A method according to claim 1, wherein said water being treated contains insufficient cations to generate flocs during said treatment, and sufficient cations are added to said water to generate flocs for removing said undesirable substances.

8. A method of treating water according to claim 1, which further comprises a second treatment of diffusing the treated water, after said removal of said separated undesirable substances, into additional water containing the same or different undesirable substances.

9. A method according to claim 8, wherein said additional water being treated is water containing chlorophyll, algae, or a mixture thereof.

10. A method according to claim 8, wherein said treated water and said additional water together contain insufficient cations to generate flocs during said second treatment, and sufficient cations are added to said treated water or said additional water, or both, to generate flocs for removing said undesirable substances in said additional water.

11. A method according to claim 10, wherein said additional water being treated is water containing chlorophyll, algae, or a mixture thereof.

* * * * *